US012183320B2

(12) United States Patent
Kim et al.

(10) Patent No.: US 12,183,320 B2
(45) Date of Patent: Dec. 31, 2024

(54) METHOD AND SYSTEM FOR GENERATING SYNTHETIC SPEECH FOR TEXT THROUGH USER INTERFACE

(71) Applicant: NEOSAPIENCE, INC., Seoul (KR)

(72) Inventors: Taesu Kim, Suwon-si (KR); Younggun Lee, Seoul (KR)

(73) Assignee: NEOSAPIENCE, INC., Seoul (KR)

( * ) Notice: Subject to any disclaimer, the term of this patent is extended or adjusted under 35 U.S.C. 154(b) by 0 days.

(21) Appl. No.: 17/152,913

(22) Filed: Jan. 20, 2021

(65) Prior Publication Data

US 2021/0142783 A1 May 13, 2021

Related U.S. Application Data

(63) Continuation of application No. PCT/KR2020/004857, filed on Apr. 9, 2020.

(30) Foreign Application Priority Data

Apr. 9, 2019 (KR) ........................ 10-2019-0041620
Apr. 9, 2020 (KR) ........................ 10-2020-0043362

(51) Int. Cl.
*G10L 13/08* (2013.01)
*G10L 13/033* (2013.01)
*G10L 13/047* (2013.01)

(52) U.S. Cl.
CPC ............ *G10L 13/08* (2013.01); *G10L 13/033* (2013.01); *G10L 13/047* (2013.01); *G10L 2013/083* (2013.01)

(58) Field of Classification Search
None
See application file for complete search history.

(56) References Cited

U.S. PATENT DOCUMENTS 6,006,187 A * 12/1999 Tanenblatt ............ G10L 13/033 704/260
8,150,695 B1 * 4/2012 Killalea ................ G06F 40/279 704/260

(Continued)

FOREIGN PATENT DOCUMENTS

JP 2008046951 A 2/2008
JP 2016170218 A 9/2016

(Continued)

OTHER PUBLICATIONS

"S. Yang, Z. Wu and L. Xie, "On the training of DNN-based average voice model for speech synthesis," 2016 Asia-Pacific Signal and Information Processing Association Annual Summit and Conference (APSIPA), 2016, pp. 1-6, doi: 10.1109/APSIPA.2016.7820818." (Year: 2016).*

(Continued)

*Primary Examiner* — Jesse S Pullias
(74) *Attorney, Agent, or Firm* — Dinsmore & Shohl LLP; Yongsok Choi, Esq.

(57) ABSTRACT

A method for generating synthetic speech for text through a user interface is provided. The method may include receiving one or more sentences, determining a speech style characteristic for the received one or more sentences, and outputting a synthetic speech for the one or more sentences that reflects the determined speech style characteristic. The one or more sentences and the determined speech style characteristic may be inputted to an artificial neural network text-to-speech synthesis model and the synthetic speech may be generated based on the speech data outputted from the artificial neural network text-to-speech synthesis model.

20 Claims, 13 Drawing Sheets

(56) References Cited

U.S. PATENT DOCUMENTS

| | | | | |
|---|---|---|---|---|
| 10,930,263 | B1 * | 2/2021 | Mahyar | G10L 15/005 |
| 2014/0025382 | A1 * | 1/2014 | Chen | G10L 13/10 704/260 |
| 2014/0122079 | A1 * | 5/2014 | Kaszczuk | G10L 13/08 704/260 |
| 2015/0243275 | A1 * | 8/2015 | Luan | G10L 13/08 704/260 |
| 2017/0186418 | A1 * | 6/2017 | Mairano | G10L 13/07 |
| 2019/0196666 | A1 * | 6/2019 | Kurzweil | G06F 3/0482 |
| 2019/0295527 | A1 * | 9/2019 | Pore | G06F 40/263 |
| 2020/0066250 | A1 * | 2/2020 | Morita | G06Q 30/0283 |
| 2021/0366462 | A1 * | 11/2021 | Yang | G06F 40/30 |

FOREIGN PATENT DOCUMENTS

| | | | | |
|---|---|---|---|---|
| KR | 100768127 | B1 | 10/2007 | |
| KR | 1020180078197 | A | 7/2018 | |
| KR | 20200056261 | A * | 2/2019 | G10L 13/02 |
| WO | WO-2007052264 | A2 * | 5/2007 | G06F 17/214 |
| WO | 2008123757 | A1 | 10/2008 | |

OTHER PUBLICATIONS

RJ Skerry-Ryan, Towards End-to-End Prosody Transfer for Expressive Speech Synthesis with Tacotron, Mar. 24, 2018, arXiv, pp. 1-11 (Year: 2018).*

"S. Yang, Z. Wu and L. Xie, "On the training of DNN-based average voice model for speech synthesis," 2016 Asia-Pacific Signal and Information Processing Association Annual Summit and Conference (APSIPA), Jeju, Korea (South), 2016, pp. 1-6, doi: 10.1109/APSIPA.2016.7820818." (Year: 2016).*

International Search Report of PCT/KR2020/004857 dated Jul. 22, 2020.

Younggun Lee, et al., "Emotional End-to-End Neural Speech Synthesizer", Paper, Nov. 28, 2017, version 2.

RJ Skerry-Ryan, et al., "Towards End-to-End Prosody Transfer for Expressive Speech Synthesis with Tacotron," Journal in Proceedings of the 35th International Conference on Machine Learning (PMLR), Mar. 23, 20180, Stockholm, Sweden.

* cited by examiner

METHOD AND SYSTEM FOR GENERATING SYNTHETIC SPEECH FOR TEXT THROUGH USER INTERFACE

CROSS-REFERENCE TO RELATED APPLICATIONS

This application is a continuation of International Application No. PCT/KR2020/004857 filed on Apr. 9, 2020 which claims priority to Korean Patent Application No. 10-2019-0041620 filed on Apr. 9, 2019 and Korean Patent Application No. 10-2020-0043362 filed on Apr. 9, 2020, the entire contents of which are herein incorporated by reference.

TECHNICAL FIELD

The present disclosure relates to a method and system for generating a synthetic speech for text through a user interface, and more specifically, to a method for providing a user interface that is capable of reflecting changes in prosody and speech according to speaker, style, speed, emotion, context, and situation for the text to an output speech.

BACKGROUND ART

For the broadcasting programs including audio contents, numerous programs have been produced and released for not only the conventional broadcasting channels such as TVs and radios, but also the web-based video services such as YouTube and podcasts provided online. In order to generate such a program including audio content, applications for generating or editing audio content including audio are widely used.

However, it is cumbersome for the user to generate audio content to be used in such video programs, since the user has to recruit actors such as voice actors or announcers and record the speech corresponding to the content through a recorder, and edit the recorded speech using the application. Researches have been conducted to alleviate this hassle, for producing unrecorded speech and/or content using speech synthesis technology without recording human speech to produce audio content.

Generally, the speech synthesis technology, also called text-to-speech (TTS), is a technology used to reproduce a desired speech on an application such as announcement, navigation, artificial intelligence (AI) assistance and the like requiring human voice, without pre-recording actual human voice. Typical speech synthesis methods include the concatenative TTS that divides and stores a speech into very short units such as phonemes and combines the phonemes of a target sentence to synthesize a speech, and the parametric TTS which expresses characteristics of the speech by parameters and use a vocoder to synthesize the parameters expressing the characteristics of the speech of a target sentence into a speech corresponding to the sentence.

However, while the conventional speech synthesis technologies may be used to produce the broadcast programs, the audio contents generated through these speech synthesis technologies do not reflect the speaker's personality and emotions, and accordingly, their effectiveness as audio contents for producing a broadcast program may be degraded. Moreover, in order to ensure that the quality of broadcast programs through speech synthesis technologies is similar to the broadcast program produced through human recording, a technique is required, which reflects the style of the speaker who spoke the line, for each of the lines in the audio contents that are generated using the speech synthesis technologies. Furthermore, for the purpose of production and editing of the broadcast program, a user interface technology is also required, which enables a user to intuitively and easily generate and edit audio content by reflecting styles based on text.

SUMMARY

Technical Problem

Embodiments of the present disclosure relate to a method for generating and editing a synthetic speech for text, in which the synthetic speech is natural and realistic for the input text, by providing a user interface that allows to reflect changes in prosody and speech according to styles, emotions, contexts, and circumstances of the input text to the synthetic speech or audio content.

Technical Solution

The present disclosure may be implemented in a variety of ways, including a method, a system, a device, or a computer program stored in a computer-readable storage medium.

A method for generating a synthetic speech for text through a user interface according to an embodiment of the present disclosure may include receiving one or more sentences, determining a speech style characteristic for the received one or more sentences, and outputting a synthetic speech for the one or more sentences that reflects the determined speech style characteristic, in which the one or more sentences and the determined speech style characteristic may be inputted to an artificial neural network text-to-speech synthesis model and the synthetic speech may be generated based on speech data outputted from the artificial neural network text-to-speech synthesis model.

According to an embodiment, the method may further include outputting the received one or more sentences, in which the determining the speech style characteristics of the received one or more sentences may include changing setting information for at least a part of the outputted one or more sentences, the speech style characteristic applied to the at least part of the one or more sentences may be changed based on the changed setting information, and the at least part of the one or more sentences and the changed speech style characteristic may be inputted to the artificial neural network text-to-speech synthesis model and the synthetic speech may be changed based on speech data outputted from the artificial neural network text-to-speech synthesis model.

According to an embodiment, the changing the setting information for the at least part of the outputted one or more sentences may include changing the setting information for visual representation of the part of the outputted one or more sentences.

According to an embodiment, the receiving the one or more sentences may include receiving a plurality of sentences, the method may further include adding a visual representation indicative of characteristic of an effect to be inserted between the plurality of sentences, and the synthetic speech may include a sound effect generated based on the characteristic of the effect included in the added visual representation.

According to an embodiment, the effect to be inserted between the plurality of sentences may include a silence, and the adding the visual representation indicative of the characteristic of the effect to be inserted between the plurality of sentences may include adding a visual representation indicative of a time of the silence to be inserted between the plurality of sentences.

According to an embodiment, the receiving the one or more sentences may include receiving a plurality of sentences, the method may include dividing the plurality of sentences into one or more sets of sentences, and the determining the speech style characteristic for the received one or more sentences may include determining a role corresponding to the divided one or more sets of sentences, and setting a predetermined speech style characteristic corresponding to the determined role.

According to an embodiment, the divided one or more sets of sentences may be analyzed using natural language processing, and the determining the role corresponding to the divided one or more sets of sentences may include outputting one or more role candidates recommended based on the analysis result of the one or more sets of sentences, and selecting at least a part of the outputted one or more role candidates.

According to an embodiment, the divided one or more sets of sentences may be grouped based on the analysis result, and the determining the role corresponding to the divided one or more sets of sentences may include outputting one or more role candidates corresponding to each of the grouped sets of sentences recommended based on the analysis result, and selecting at least a part of the outputted one or more role candidates.

According to an embodiment, the determining the speech style characteristic for the received one or more sentences may include outputting one or more speech style characteristic candidates recommended based on the analysis result of the one or more sets of sentences, and selecting at least a part of the outputted one or more speech style characteristic candidates.

According to an embodiment, the synthetic speech for the one or more sentences may be inspected, and the method may further include changing the speech style characteristic applied to the synthetic speech based on the inspection result.

According to an embodiment, an audio content including synthetic speech may be generated.

According to an embodiment, the method may further include, in response to a request to download the generated audio content, receiving the generated audio content.

According to an embodiment, the method may further include, in response to a request to stream the generated audio content, playing back the generated audio content in real time.

According to an embodiment, the method may further include mixing the generated audio content with a video content.

According to an embodiment, the method may further include outputting the received one or more sentences, the determining the speech style characteristic for the received one or more sentences may include selecting at least a part of the outputted one or more sentences, outputting an interface for changing the speech style characteristic for the at least part of the selected one or more sentences, and changing a value indicative of the speech style characteristic for the at least part through the interface, and the at least part of the one or more sentences and the changed value indicative of the speech style characteristic are inputted to the artificial neural network text-to-speech synthesis model and the synthetic speech is changed based on speech data outputted from the artificial neural network text-to-speech synthesis model.

A computer program is provided, which is stored on a computer-readable recording medium for executing, on a computer, a method for generating synthetic speech for text described above according to an embodiment of the present disclosure.

Effects of the Disclosure

According to some embodiments of the present disclosure, when a user opens a document and edits the document content as in a document writer (e.g., word processor or the like), a user interface for generating and editing audio content enables the user to automatically generate the audio content according to the look and feel of the document.

According to some embodiments of the present disclosure, it is configured such that a speech style can be proposed, and the proposed style can be easily selected by the user.

According to some embodiments of the present disclosure, it is configured such that the speech style characteristic for the text is automatically determined using the natural language processing or the like.

According to some embodiments of the present disclosure, a user interface device for generating and editing audio content enables the user to adjust the height, speed, and the like of a detailed style of the speech by the unit of each word, phoneme, or syllable.

According to some embodiments of the present disclosure, the user interface for generating and editing audio content can visually show the selected style for the text so that the user can intuitively recognize the same, which thus allows the user to edit the style with ease.

According to some embodiments of the present disclosure, the synthetic speech reflecting the speaker or style determined for the text can be generated, and audio content including the generated synthetic speech can be applied.

DETAILED DESCRIPTION

Figure 1:
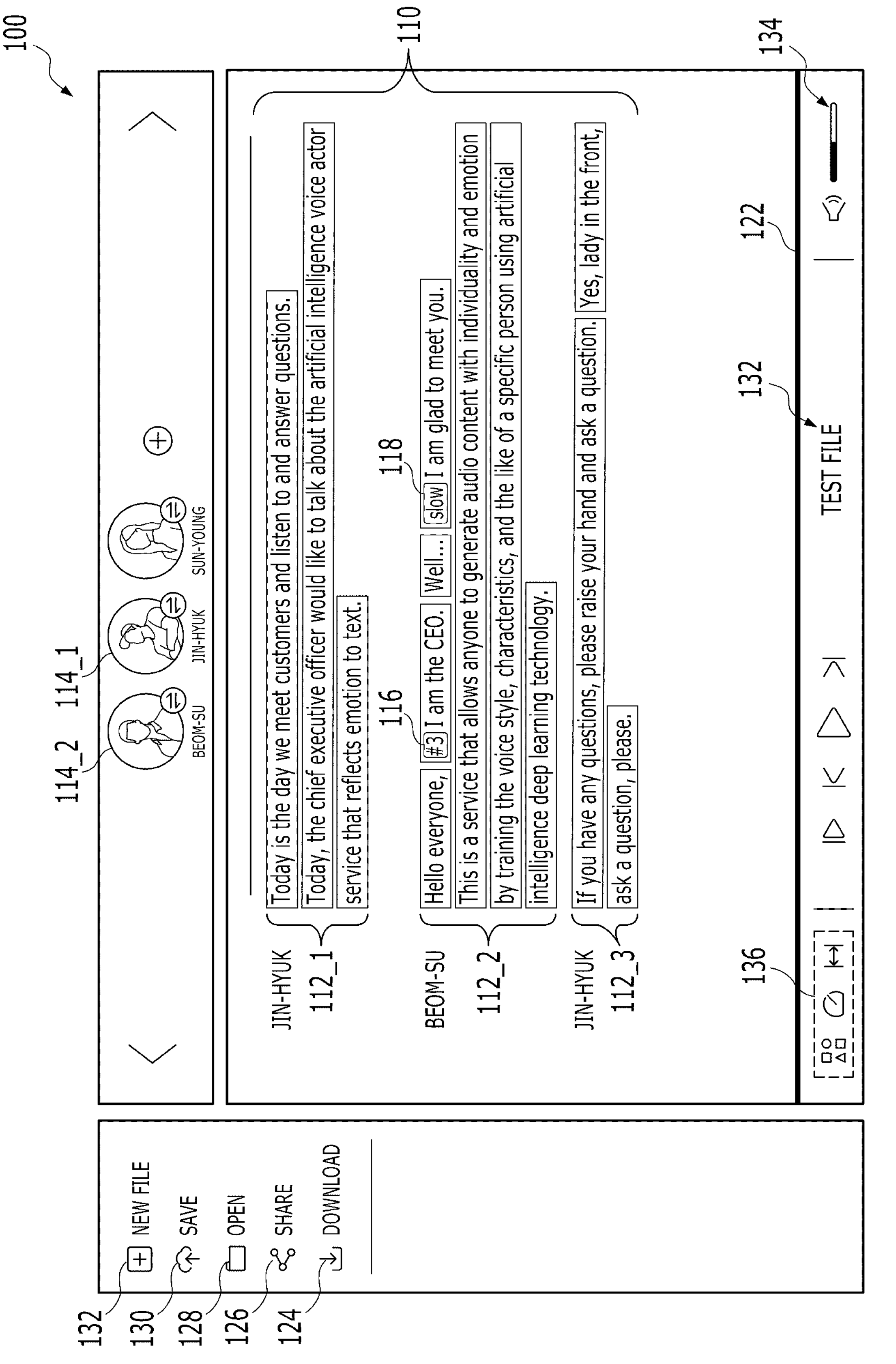
FIG. 1 is a diagram illustrating an exemplary screen of a user interface for providing a speech synthesis service according to an embodiment of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Furthermore, the term "module" used herein denotes a software or hardware component, and the "module" performs certain roles. However, the meaning of the "module" is not limited to software or hardware. The "module" may be configured to be in an addressable storage medium or configured to execute one or more processors. Accordingly, as an example, the "module" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" may be combined into a smaller number of components and "modules", or further divided into additional components and "modules".

According to an embodiment of the present disclosure, the "module" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

Hereinafter, exemplary embodiments will be fully described with reference to the accompanying drawings in such a way that those skilled in the art can easily carry out the embodiments. Further, in order to clearly illustrate the present disclosure, parts not related to the description are omitted in the drawings.

As used herein, the "speech style characteristic" may include a component or identification element of a speech. For example, the speech style characteristic may include a speech style (e.g., tone, strain, parlance, and the like), a speech speed, an accent, an intonation, a pitch, a loudness, a frequency, and the like. In addition, as used herein, a "role" may include a speaker or character who utters the text. In addition, the "role" may include a predetermined speech style characteristic corresponding to each role. The "role" and the "speech style characteristic" are used separately, but the "role" may be included in the "speech style characteristic".

As used herein, "setting information" may include visually recognizable information for distinguishing speech style characteristics that are set for one or more sentences through the user interface. For example, it may mean information such as a font, a font style, a font color, a font size, a font effect, an underline, an underline style, and the like that is applied to one or more sentences. As another example, the setting information such as "#3", "slow", and "1.5 s" indicative of speech style, sound effect, or silence may be displayed through the user interface.

As used herein, a "sentence" may refer to a plurality of texts divided based on a punctuation mark such as a period, an exclamation mark, a question mark, a quotation mark, and the like. For example, the text "Today is the day we meet customers and listen to and answer questions." can be divided into a separate sentence from the subsequent texts based on the period. In addition, a "sentence" may be divided from the text in response to a user's input for sentence division. That is, one sentence formed by dividing the text based on the punctuation mark may be divided into at least two sentences in response to a user's input for sentence division. For example, in a sentence "After eating, we went home", by inputting an Enter after "eating", user can divide the sentence into a sentence "After eating" and a sentence "we went home".

As used herein, a "set of sentences" may be composed of one or more sentences, and a group formed by grouping the set of sentences may be composed of one or more sets of sentences. The "set of sentences" and the "sentence" are used separately, but the "sentence" may include the "set of sentences".

FIG. 1 is a diagram illustrating an exemplary screen 100 of a user interface for providing a speech synthesis service according to an embodiment of the present disclosure. The user interface for providing a speech synthesis service may be provided to a user terminal that is operable by a user. In this example, the user terminal may refer to any electronic device with one or more processors and memories.

As shown, the user interface may be displayed on an output device (e.g., a display) connected to or included in the user terminal. In addition, the user interface may be configured to receive text information (e.g., one or more sentences, one or more phrases, one or more words, one or more phonemes, and the like) through an input device (e.g., a keyboard or the like) connected to or included in the user terminal, and provide a synthetic speech corresponding to the received text information. In this case, the input text information may be provided to a synthetic speech generation system, which is configured to provide a synthetic speech corresponding to the text. For example, the synthetic speech generation system may be configured to input one or more sentences and speech style characteristics into an artificial neural network text-to-speech synthesis model and generate outputted speech data for the one or more sentences which reflects the speech style characteristics. Such a synthetic speech generation system may be executed by any computing device such as a user terminal or a system accessible from the user terminal.

In order to provide a speech synthesis service, one or more sentences may be received through the user interface. As shown in the user interface screen 100, a plurality of sentences 110 intended for speech synthesis may be received and then displayed through a display. In an embodiment, inputs for a plurality of sentences may be received through an input device (e.g., a keyboard), and the plurality of input sentences 110 may be displayed. In another embodiment, a document format file including a plurality of sentences may be uploaded through the user interface, and a plurality of sentences included in the document file may be outputted. For example, when the "Open" icon 128 arranged on an upper-left side of the user interface screen 100 is clicked, a document format file accessible from the user terminal or accessible through the cloud system may be uploaded through the user interface. In this example, the document format file may refer to any document format file that can be supported by the synthetic speech generation system, such as a project file, a text file, or the like which are editable through the user interface, for example.

A plurality of sentences received through the user interface may be divided into one or more sets of sentences. According to an embodiment, the user may edit a plurality of sentences displayed through the user interface and divide them into one or more sets of sentences. According to another embodiment, a plurality of sentences received through the user interface may be analyzed through natural language processing or the like, and divided into one or more sets of sentences. The divided one or more sets of sentences may be displayed through the user interface. For example, as shown in the user interface screen 100, the sentence "Today is the day we meet customers and listen to and answer questions." and the sentence "Today, the chief executive officer would like to talk about the artificial intelligence voice actor service that reflects emotion to text." may be divided into one set of sentences (hereinafter, "set A", 112_1). In addition, a sentence "Hello everyone, I am the CEO.", a sentence "Well . . . ", a sentence "I'm glad to meet you.", and a sentence "This is a service that allows anyone to generate audio content with individuality and emotion by training the voice style, characteristics, and the like of a specific person using artificial intelligence deep learning technology." may be divided into another set of sentences (hereinafter, "set B", 112_2). In a manner similar to that described above, a sentence "If you have any questions, please raise your hand and ask a question" and a sentence "Yes, lady in the front, ask a question, please." may be divided into another set of sentences (hereinafter, "set C", 112_3).

A role corresponding to the divided one or more sets of sentences may be determined. According to an embodiment, different roles may be determined for each of a plurality of different sets of sentences, or alternatively, same roles may be determined. For example, as shown in the user interface screen 100, a role "Jin-hyuk" 114_1 may be determined for the set A 112_1, and a different role "Beom-su" 114_2 may be determined for the set B 112_2. In addition, for the set C 112_3, the role "Jin-hyuk" 114_1, which is the same role as that of the set A 112_1 may be determined. In this case, predetermined speech style characteristics corresponding to the determined roles may be set or determined for each set of sentences. These speech style characteristics corresponding to roles may also be changed according to a user input.

According to an embodiment, the role "Jin-hyuk" 114_1, which is a role corresponding to the set A 112_1 and the set C 112_3, may be changed to another role (e.g., Chan-gu, or the like) that may be provided through the user interface. For example, with a portion corresponding to "Jin-hyuk" 114_1 being selected, one or more roles may be displayed through the user interface. Then, from among the one or more roles displayed, the user may select one role such that the role "Jin-hyuk" 114_1 may be changed to the one selected role. With this change, the previous role "Jin-hyuk" corresponding to the set A 112_1 and the set C 112_3 may be changed to the selected role. In this case, a predetermined speech style characteristic corresponding to the selected role may be set for the set A 112_1 and the set C 112_3.

The divided one or more sets of sentences may be analyzed using the natural language processing or the like, and some sets of sentences among the plurality of different sets of sentences may be grouped. Here, the same role may be determined for a plurality of different sets of sentences grouped into one group. For example, based on a result of analysis through natural language processing or the like, the set A 112_1 and the set C 112_3 may correspond to the set of sentences of the same speaker and be grouped into one group. Accordingly, one or more role candidates may be recommended for the set A 112_1 and the set C 112_3. In response to the user selecting one from among the one or more recommended role candidates, the same role may be selected or determined for the set A 112_1 and the set C 112_3. For example, as shown in the user interface screen 100, the role "Jin-hyuk" 114_1 may be determined for the set A 112_1 and the set C 112_3.

The speech style characteristics may be determined for the received one or more sentences. These speech style characteristics may be determined or changed based on the setting information for one or more sentences. In an embodiment, such setting information may be determined or changed according to a user input. For example, the user may input or change setting information through a plurality of icons 136 located on a lower-left side of the user interface screen 100. According to another embodiment, the synthetic speech generation system may analyze one or more sentences to automatically determine the setting information for one or more sentences. For example, as shown in the user interface screen 100, the setting information 116 ("#3") may be determined and displayed in the sentence "I am the CEO.", and the speech style characteristic of the sentence "I am the CEO." may be determined as the speech style characteristic of "awkwardly" corresponding to the setting information 116 ("#3"). As another example, the setting information 118 ("slow") may be determined and displayed in the sentence of "I am glad to meet you.", and the speech style characteristic for the sentence "I am glad to meet you" may be determined to be the slow speed style characteristic.

The synthetic speech for one or more sentences reflecting the speech style characteristics determined as described above may be outputted through the user interface. According to an embodiment, the synthetic speech generation system may input one or more sentences and speech style characteristics into the artificial neural network text-to-speech synthesis model to generate outputted speech data reflecting the speech style characteristics and provide it through the user interface. The synthetic speech may be generated based on the outputted speech data.

In response to the user request, audio content including the generated synthetic speech may be generated and provided through the user interface. Here, the audio content may include any sound and/or silence in addition to the generated synthetic speech. In an embodiment, when the user requests the audio content by clicking a playback icon in a bar 122 displayed at the bottom of the user interface screen 100, streaming of audio content may be outputted through a speaker connected to or included in the user terminal. In this case, for example, a streaming bar arranged to the right of the bar 122 displayed at the bottom of the user interface screen 100 is displayed, and the position of the speech currently being output in the entire synthetic speech may be displayed in the streaming bar 134. As another example, when the user clicks a "Download" icon 124 displayed on an upper-left side of the user interface screen 100, the audio content may be downloaded to the user terminal.

According to an embodiment, when the user clicks a "New file" icon 132 arranged on an upper-left side of the user interface screen 100, a new file for speech synthesis task may be generated. As used herein, a "Test file" which is a file generated through the "new file" icon 132 may be displayed in the bar 122 displayed at the bottom of the user interface screen 100. In addition, the user is able to perform edition of text and/or generation of synthetic speech for the synthetic speech service, and may store a file in process by clicking a "Save" icon 130. In addition, the user may click a "Share" icon 126 to share the synthetic speech corresponding to the input text with other users.

The user interface for generating a synthetic speech for text according to the present disclosure may be provided to the user in various ways that may be executed by the user terminal, such as, provided to the user through a web browser or an application, for example. In addition, FIG. 1 shows the bar and/or icon as being arranged at a specific location on the user interface screen 100, but the present disclosure is not limited thereto, and the bar and/or icon may be arranged at any location on the user interface screen 100.

Figure 2:
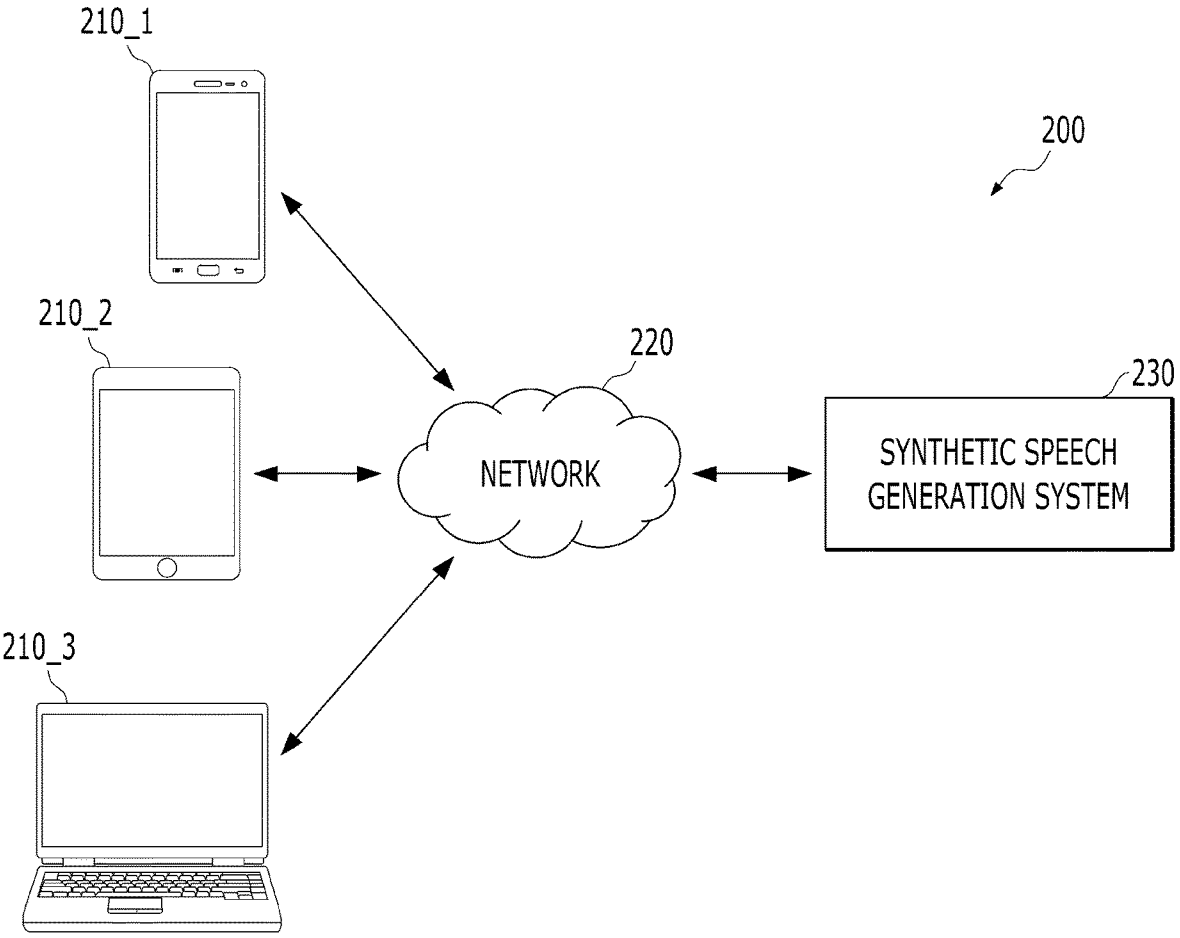
FIG. 2 is a schematic diagram illustrating a configuration in which a plurality of user terminals and a synthetic speech generation system are communicatively connected to each other to provide a service for generating a synthetic speech for text according to an embodiment of the present disclosure.

FIG. 2 is a schematic diagram illustrating a configuration 200 in which a plurality of user terminals 210_1, 210_2, and 210_3 and a synthetic speech generation system 230 are communicatively connected to each other to provide a service for generating a synthetic speech for text according to an embodiment of the present disclosure.

The plurality of user terminals 210_1, 210_2, and 210_3 may communicate with the synthetic speech generation system 230 through a network 220. The network 220 may be configured to enable communication between the plurality of user terminals 210_1, 210_2, and 210_3 and the synthetic speech generation system 230. The network 220 may be configured as a wired network 220 such as Ethernet, a wired home network (Power Line Communication), a telephone line communication device and RS-serial communication, a wireless network 220 such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 220 as well as short-range wireless communication between user terminals 210_1, 210_2, and 210_3. For example, the network 220 may include any one or more of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more of network topologies including a bus network, a star network, a ring network, a mesh network, a star-bus network, a tree or hierarchical network, and the like, but not limited thereto.

Figure 3:
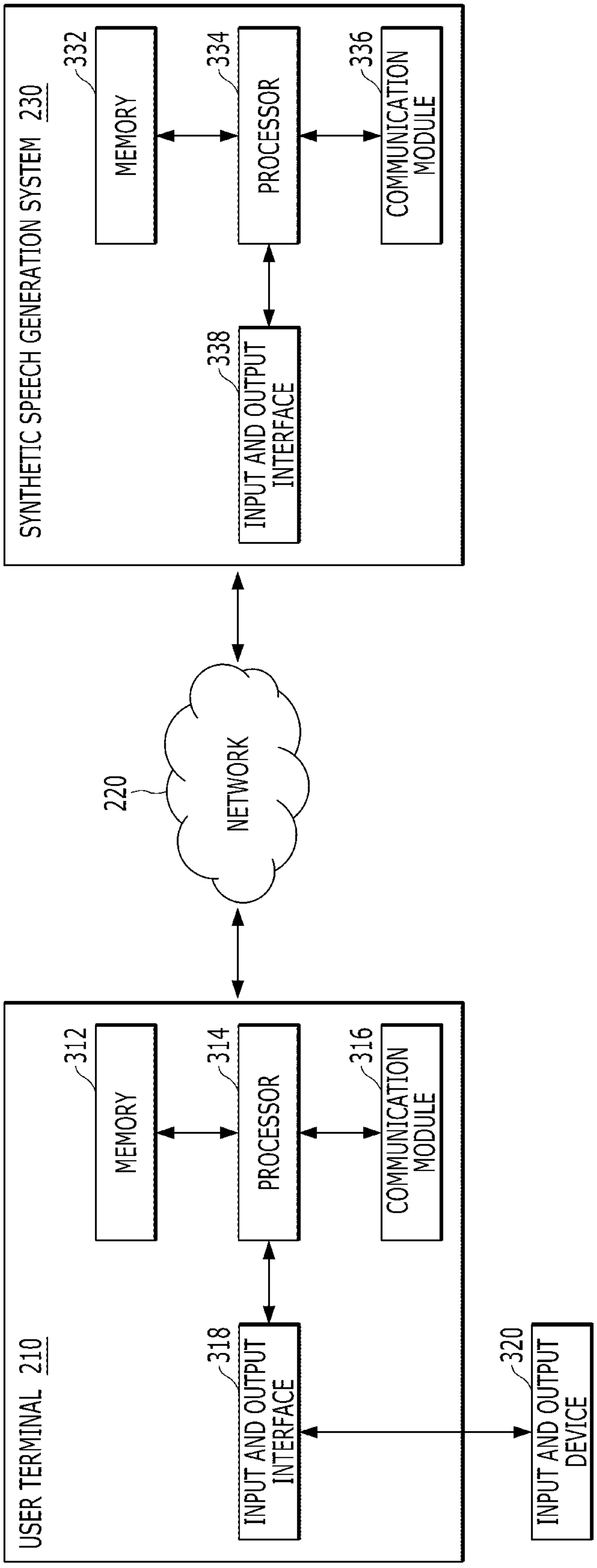
FIG. 3 is a block diagram illustrating internal configurations of the user terminal and the synthetic speech generation system according to an embodiment of the present disclosure.

FIG. 2 shows a mobile phone or a smart phone 210_1, a tablet computer 210_2, and a laptop or desktop computer 210_3 as the examples of the user terminals that execute or operate the user interface for providing a speech synthesis service, but embodiments are not limited thereto, and the user terminals 210_1, 210_2, and 210_3 may be any computing device that is capable of wired and/or wireless communication and that is installed with a web browser, a mobile browser application, or a speech synthesis generating application to execute the user interface for providing a speech synthesis service. For example, the user terminal 210 may include a smart phone, a mobile phone, a navigation terminal, a desktop computer, a laptop computer, a digital broadcasting terminal, a personal digital assistant (PDA), a portable multimedia player (PMP), a tablet computer, a game console, a wearable device, an internet of things (IoT) device, a virtual reality (VR) device, an augmented reality (AR) device, and the like. In addition, FIG. 3 shows three user terminals 210_1, 210_2, and 210_3 in communication with the synthetic speech generation system 230 through the network 220, but the present disclosure is not limited thereto, and a different number of user terminals may be configured to be in communication with the synthetic speech generation system 230 through the network 220.

The user terminals 210_1, 210_2, and 210_3 may receive one or more sentences through the user interface for providing a speech synthesis service. According to an embodiment, according to an input for one or more sentences through an input device (e.g., a keyboard) connected to or included in the user terminals 210_1, 210_2, and 210_3, the user terminals 210_1, 210_2, and 210_3 may receive one or more sentences. According to another embodiment, one or more sentences included in a document format file uploaded through the user interface may be received. The one or more sentences received as described above may be provided to the synthetic speech generation system 230.

The user terminals 210_1, 210_2, and 210_3 may determine or change the setting information for at least a part of the one or more sentences. According to an embodiment, the user terminal may select a sentence for at least a part of the one or more sentences outputted through the user interface, and designate a predetermined value and/or term indicative of a specific speech style for the selected sentence to thus determine or change the setting information for the selected sentence. The determination or change of the setting information may be performed in response to a user input. According to another embodiment, the user terminals 210_1, 210_2, and 210_3 may change the setting information (e.g., a font, a font style, a font color, a font size, a font effect, an underline, an underline style, or the like) for visual representation of at least a part of the outputted one or more sentences. For example, the user terminals 210_1, 210_2, and 210_3 may change the font size for at least a part of the outputted one or more sentences from 10 to 12, to thus change the setting information for at least a part of the outputted sentences. As another example, the user terminals 210_1, 210_2, and 210_3 may change the font color for at least a part of the outputted one or more sentences from black to red, to thus change the setting information for at least a part of the outputted sentences.

According to an embodiment, the user terminal may determine or change a speech style for a corresponding sentence in response to the setting information that is determined or changed for the one or more sentences. The changed speech style may be provided to the synthetic speech generation system 230. According to another embodiment, the user terminal may provide the determined or changed setting information for the one or more sentences to the synthetic speech generation system 230, and the synthetic speech generation system 230 may determine or change the speech style corresponding to the determined or changed setting information.

In an embodiment, in response to a user input, the user terminals 210_1, 210_2, and 210_3 may add a visual representation indicative of the characteristics of an effect to be inserted between a plurality of sentences. For example, the user terminals 210_1, 210_2, and 210_3 may receive an input to add "#2", which is a visual representation indicative of a predetermined sound effect to be inserted between two sentences among a plurality of sentences outputted through the user interface. As another example, the user terminals 210_1, 210_2, and 210_3 may receive an input to add "1.5 s", which is a visual representation indicative of the time of silence to be inserted between two sentences among a plurality of sentences outputted through the user interface. The visual representation added as described above may be provided to the synthetic speech generation system 230, and sound effects (including silent sounds) corresponding to the added visual representation may be included or reflected in the generated synthetic speech.

The user terminals 210_1, 210_2, and 210_3 may determine a role that corresponds to the one or more sentences, the one or more sets of sentences, and/or the grouped sets of sentences outputted through the user interface. For example, the synthetic speech generation system 230 may receive an input from the user terminals 210_1, 210_2, and 210_3 for determining "Beom-su" as a role corresponding to the one set of sentences, and determine the role "Beom-su" for the one or more sets of sentences. Then, the user terminals 210_1, 210_2, and 210_3 may set a speech style corresponding to the determined role (e.g., a predetermined speech style corresponding to the determined role), and provide the set speech style to the synthetic speech generation system 230. Alternatively, the user terminals 210_1, 210_2, and 210_3 may provide the synthetic speech generation system 230 with the role determined according to the user input, and the synthetic speech generation system 230 may set a predetermined speech style corresponding to the determined role.

The synthetic speech generation system 230 may analyze the received one or more sentences or set of sentences, and recommend a role candidate and/or a speech style characteristic candidate to the corresponding sentences or set of sentences based on the analyzed result. Here, for the analysis of the one or more sentences or set of sentences received, any processing method such as a natural language processing method that can recognize and process the input language may be used. The recommended role candidate or speech style characteristic candidate may be transmitted to the user terminals 210_1, 210_2, and 210_3, and outputted in association with the corresponding sentence through the user interface. In addition, in response to this, the user terminals 210_1, 210_2, and 210_3 may receive a user input to select at least a part of the outputted one or more role candidates and/or at least a part of the outputted one or more speech style characteristic candidates, and based on the input, a selected role candidate and/or a style candidate may be set for the corresponding sentence.

The synthetic speech generation system 230 may transmit outputted speech data reflecting the determined or changed speech style characteristics and/or synthetic speech generated based on the outputted speech data to the user terminals 210_1, 210_2, and 210_3. In addition, the synthetic speech generation system 230 may receive a request for audio content including the synthetic speech from the user terminals 210_1, 210_2, and 210_3, and transmit the audio content to the user terminals 210_1, 210_2, and 210_3 according to the received request. According to an embodiment, the synthetic speech generation system 230 may receive, from the user terminals 210_1, 210_2, and 210_3, a request to stream the audio content including the synthetic speech, and the user terminal that made the request to stream may receive the corresponding audio content from the synthetic speech generation system 230. According to another embodiment, the synthetic speech generation system 230 may receive, from the user terminals 210_1, 210_2, a request to download the audio content including the synthetic speech, 210_3, and the user terminal that made the request to download may receive the audio content from the synthetic speech generation system 230. According to still another embodiment, the synthetic speech generation system 230 may receive, from the user terminals 210_1, 210_2, and 210_3, a request to share the audio content including the synthetic speech, and transmit the audio content to the user terminal designated by the user terminal that made the request to share.

FIG. 2 shows each of the user terminals 210_1, 210_2, and 210_3 and the synthetic speech generation system 230 as separate elements, but embodiments are not limited thereto, and the synthetic speech generation system 230 may be configured to be included in each of the user terminals 210_1, 210_2, and 210_3.

FIG. 3 is a block diagram illustrating the internal configuration of the user terminal 210 and the synthetic speech generation system 230 according to an embodiment of the present disclosure. The user terminal 210 may refer to any computing device capable of wired/wireless communication, and may include the mobile phone terminal 210_1, the tablet terminal 210_2, and the PC terminal 210_3 of FIG. 2, and the like. As illustrated, the user terminal 210 may include a memory 312, a processor 314, a communication module 316, and an input and output interface 318. Likewise, the synthetic speech generation system 230 may include a memory 332, a processor 334, a communication module 336, and an input and output interface 338. As illustrated in FIG. 3, the user terminal 210 and the synthetic speech generation system 230 may be configured to communicate information and/or data through the network 220 using the respective communication modules 316 and 336. In addition, the input and output device 320 may be configured to input information and/or data to the user terminal 210 or to output information and/or data generated from the user terminal 210 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and the like. As another example, a non-destructive mass storage device such as ROM, SSD, flash memory, disk drive, and the like may be included in the user terminal 210 or the synthetic speech generation system 230 as a separate permanent storage device that is separate from the memory. In addition, an operating system and at least one program code (e.g., a code for providing a synthetic speech service through a user interface, a code for an artificial neural network text-to-speech synthesis model, and the like) may be stored in the memories 312 and 332.

These software components may be loaded from a computer-readable recording medium separate from the memories 312 and 332. Such a separate computer-readable recording medium may include a recording medium directly connectable to the user terminal 210 and the synthetic speech generation system 230, and may include a computer-readable recording medium such as a floppy drive, a disk, a tape, a DVD/CD-ROM drive, a memory card, and the like, for example. As another example, the software components may be loaded into the memories 312 and 332 through the communication modules rather than the computer-readable recording medium. For example, at least one program may be loaded into the memories 312 and 332 based on a computer program (for example, artificial neural network text-to-speech synthesis model program) installed by files provided by developers or a file distribution system for distributing an installation file of an application or an application through the network 220.

The processors 314 and 334 may be configured to process instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the synthetic speech generation system 230 to communicate with each other through the network 220, and may provide a configuration or function for the user terminal 210 and/or the synthetic speech generation system 230 to communicate with another user terminal or another system (e.g., a separate cloud system, a separate audio content sharing support system, and the like). For example, a request (e.g., a request to download audio content, a request to stream audio content) generated by the processor 314 of the user terminal 210 according to the program code stored in the recording device such as the memory 312 or the like may be transmitted to the synthetic speech generation system 230 through the network 220 under the control of the communication module 316. Conversely, a control signal or instructions provided under the control of the processor 334 of the synthetic speech generation system 230 may be received by the user terminal 210 through the communication module 316 of the user terminal 210 via the communication module 336 and the network 220.

The input and output interface 318 may be a means for interfacing with the input and output device 320. As an example, the input device may include a device such as a keyboard, a microphone, a mouse, and a camera including an image sensor, and the output device may include a device such as a display, a speaker, a haptic feedback device, and the like. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, a service screen or content, which is configured with the information and/or data provided by the synthetic speech generation system 230 or other user terminals, may be displayed on the display through the input and output interface 318. While FIG. 3 illustrates that the input and output device 320 is not included in the user terminal 210, embodiment is not limited thereto, and the input and output device 320 may be configured as one device with the user terminal 210. In addition, the input and output interface 338 of the synthetic speech generation system 230 may be a means for interfacing with a device (not shown) for inputting or outputting, which may be connected to the synthetic speech generation system 230 or included in the synthetic speech generation system 230. In FIG. 3, the input and output interfaces 318 and 338 are illustrated as the components configured separately from the processors 314 and 334, but are not limited thereto, and the input and output interfaces 318 and 338 may be configured to be included in the processors 314 and 334.

The user terminal 210 and the synthetic speech generation system 230 may include more components than the components shown in FIG. 3. Meanwhile, it would be unnecessary to exactly illustrate most of the related components. According to an embodiment, the user terminal 210 may be implemented to include at least a part of the input and output devices 320 described above. In addition, the user terminal 210 may further include other components such as a transceiver, a global positioning system (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and the like are further included in the user terminal 210.

The processor 314 may receive texts, images, and the like, which may be inputted or selected through the input device 320 such as a touch screen, a keyboard, or the like connected to the input and output interface 318, and store the received texts, and/or images in the memory 312 or provide them to the synthetic speech generation system 230 through the communication module 316 and the network 220. For example, the processor 314 may receive text information composing one or more sentences, a request to change speech style characteristic, a request to stream audio content, a request to download audio content, and the like through the input device such as the touch screen or the keyboard. Accordingly, the received request and/or the result of processing the request may be provided to the synthetic speech generation system 230 through the communication module 316 and the network 220.

The processor 314 may receive an input for the text information (e.g., one or more paragraphs, sentences, phrases, words, phonemes, and the like) through the input device 320. According to an embodiment, the processor 314 may receive a text input through the input device 320, which composes one or more sentences, through the input and output interface 318. According to another embodiment, the processor 314 may receive an input to upload a document format file including one or more sentences through the user interface, through the input device 320 and the input and output interface 318. Here, in response to this input, the processor 314 may receive a document format file corresponding to the input from the memory 312. In response to the input, the processor 314 may receive one or more sentences included in the file. The received one or more sentences may be provided to the synthetic speech generation system 230 through the communication module 316. Alternatively, the processor 314 may be configured to provide the uploaded file to the synthetic speech generation system 230 through the communication module 316, and receive one or more sentences included in the file from the synthetic speech generation system 230.

The processor 314 may receive an input for the speech style characteristic of one or more sentences through the input device 320 and determine the speech style characteristic of the one or more sentences. The input and/or the determined speech style characteristic for the received speech style characteristic may be provided to the synthetic speech generation system 230 through the communication module 316. The input for the speech style characteristic of one or more sentences may include any operation of selecting a portion at which the speech style characteristic is desired to be changed. Here, the portion at which the speech style characteristic is desired to be changed may include one or more sentences, at least a part of one or more sentences, a portion between a plurality of sentences, one or more sets of sentences, grouped sets of sentences, and the like, but is not limited thereto.

According to an embodiment, the processor 314 may receive an input to determine or change the setting information for at least a part of one or more sentences through the input device 320. For example, the processor 314 may receive an input to change the setting information for the speech style or speech speed. As another example, the processor 314 may receive an input to change the setting information for visual representation, such as a font, a font style, a font color, a font size, a font effect, an underline or underline style, for the part of one or more sentences. As still another example, the processor 314 may receive an input to select at least a part of the one or more speech style characteristic candidates received from the synthetic speech generation system 230. As another example, the processor 314 may receive an input to change a value indicative of the speech style characteristic through an interface for changing the speech style characteristic for at least a part of one or more sentences. Based on the received input, the processor 314 may determine or change the setting information for at least a part of one or more sentences. Alternatively, the processor 314 may provide the received input to the synthetic speech generation system 230 through the communication module 316, and receive the speech style characteristic determined or changed according to setting information from the synthetic speech generation system 230.

According to another embodiment, the processor 314 may receive an input to add a visual representation indicative of the characteristics of an effect to be inserted between a plurality of sentences through the input device 320. For example, the processor 314 may receive an input to add a visual representation indicative of sound effects to be inserted between a plurality of sentences. As another example, the processor 314 may receive an input to add a visual representation indicative of a time period of silence to be inserted between a plurality of sentences. The processor 314 may provide the input to add a visual representation indicative of the sound effect to the synthetic speech generation system 230 through the communication module 316, and receive a synthetic speech including or reflecting the sound effect from the synthetic speech generation system 230.

The processor 314 may receive an input for roles corresponding to one or more sentences or set of sentences through the input device 320 through the input device, and determine the roles for one or more sentences or set of sentences based on the received input. For example, the processor 314 may receive an input to select at least a part of a list including one or more roles. As another example, the processor 314 may receive an input to select at least a part of one or more role candidates received from the synthetic speech generation system 230. Then, the processor 314 may be configured to set a predetermined speech style characteristic corresponding to the determined role for the sentence or set of sentences. The speech style characteristic set as described above may be provided to the synthetic speech generation system 230 through the communication module 316. Alternatively, the processor 314 may provide the role determined for the sentence or set of sentences to the synthetic speech generation system 230 through the communication module 316, receive a predetermined speech style characteristic corresponding to the determined role from the synthetic speech generation system 230, and determine the speech style characteristic for the sentence or set of sentences.

The processor 314 may receive an input indicative of a request for audio content through the input device 320 and the input and output interface 318, and provide a request corresponding to the received input to the synthetic speech generation system 230 through the communication module 316. According to an embodiment, the processor 314 may receive an input for the request to download audio content through the input device 320. In another embodiment, the processor 314 may receive an input for the request to stream audio content through the input device 320. In another embodiment, the processor 314 may receive an input for the request to share audio content through the input device 320. In response to the input, the processor 314 may receive audio content including the synthetic speech from the synthetic speech generation system 230 through the communication module 316.

The processor 314 may be configured to output the processed information and/or data through an output device such as a device capable of outputting a display (e.g. a touch screen, a display, and the like) of the user terminal 210 or a device capable of outputting an audio (e.g., a speaker). According to an embodiment, the processor 314 may display one or more sentences through the device capable of outputting a display or the like. For example, the processor 314 may output one or more sentences received from the input device 320 through the screen of the user terminal 210. As another example, the processor 314 may output one or more sentences included in the document format file received from the memory 312 through the screen of the user terminal 210. In this case, the processor 314 may output the visual representation or the setting information together with the received one or more sentences, or output one or more sentences reflecting the setting information.

The processor 314 may output an interface for determining or changing the speech style characteristic for at least a part of the one or more sentences through the screen of the user terminal 210. For example, the processor 314 may output an interface for setting or changing the speech style characteristics including the speech style, the speech speed, the sound effect, and the silence time for at least a part of the one or more sentences through the screen of the user terminal 210. As another example, the processor 314 may output the recommended role candidate or the recommended speech style characteristic candidate received from the synthetic speech generation system 230 through the screen of the user terminal 210.

The processor 314 may output synthetic speech, or audio content including the synthetic speech through a device capable of outputting an audio. For example, the processor 314 may output the synthetic speech received from the synthetic speech generation system 230, or audio content including the synthetic speech, through a speaker.

The processor 334 of the synthetic speech generation system 230 may be configured to manage, process, and/or store the information and/or data received from a plurality of user terminals including the user terminal 210 and/or a plurality of external systems. The information and/or data processed by the processor 334 may be provided to the user terminal 210 through the communication module 336. For example, the processed information and/or data may be provided to the user terminal 210 in real time or may be provided later in the historical form. For example, the processor 334 may receive one or more sentences from the user terminal 210 through the communication module 336.

The processor 334 may receive an input for the speech style characteristic of one or more sentences from the user terminal 210 through the communication module 336 and determine the speech style characteristic corresponding to the received input in the received one or more sentences. According to an embodiment, the processor 334 may determine the speech style characteristic corresponding to an input to change setting information for at least a part of one or more sentences received from the user terminal 210. For example, the processor 334 may determine the speech style or the speech speed according to the input to change the received setting information. As another example, the processor 334 may determine the speech style characteristic according to the input to change the received setting information for visual representation, such as a font, a font style, a font color, a font size, a font effect, an underline, an underline style, or the like. As another example, the processor 334 may determine the speech style characteristic corresponding to the input to select at least a part of one or more speech style characteristic candidates received from the user terminal 210. As another example, the processor 334 may determine the speech style characteristic corresponding to the input to change a value indicative of the speech style characteristic received from the user terminal 210. In this case, the value indicative of the speech style characteristic may include a pitch, speed, and loudness corresponding to the units such as phonemes, letters, and words. The processor 334 may provide the determined speech style characteristic to the processor 314 of the user terminal 210 through the communication module 336, and based on the received characteristic, the processor 314 may determine the speech style characteristic for the corresponding sentence.

According to another embodiment, the processor 334 may determine the speech style characteristic corresponding to the input to add a visual representation indicative of the characteristic of an effect to be inserted between a plurality of sentences received from the user terminal 210. The visual representation indicative of the characteristic of an effect to be inserted may include a visual representation indicative of a sound effect to be inserted or a visual representation indicative of a time of silence to be inserted. The processor 334 may provide the determined speech style characteristic to the processor 314 of the user terminal 210 through the communication module 336, and based on the received characteristic, the processor 314 may determine the speech style characteristic for a portion between the corresponding sentences.

The processor 334 may divide a plurality of sentences received from the processor 314 into one or more sets of sentences, and determine a role or speech style characteristic corresponding to the divided one or more sets of sentences. In this example, the processor may set a predetermined speech style characteristic corresponding to the determined role. According to an embodiment, the processor 334 may analyze the divided one or more sets of sentences using the natural language processing, and recommend one or more role candidates or speech style characteristic candidates based on the analysis result. For example, the processor 334 may transmit the one or more recommended role candidates or speech style characteristic candidates to the processor 314 of the user terminal 210, and the processor 314 may receive a selection of at least a part of the one or more recommended role candidates or speech style characteristic candidates to determine a role or speech style characteristic corresponding to the set of sentences.

Alternatively, the processor 334 may analyze the divided one or more sets of sentences using the natural language processing, and based on the analysis result, automatically determine one or more roles or speech style characteristics corresponding to the one or more sets of sentences, and provide the result to the processor 314 of the user terminal 210. In response, the processor 314 may determine or set one or more roles or speech style characteristics corresponding to the one or more sets of sentences.

According to another embodiment, the processor 334 may analyze and group the divided one or more sets of sentences using the natural language processing, and recommend one or more role candidates corresponding to each of the grouped sets of sentences based on the analysis result. For example, the processor 334 may transmit the one or more recommended role candidates to the processor 314 of the user terminal 210, and the processor 314 may receive selection of at least a part of the one or more recommended role candidates to determine a role corresponding to the grouped sets of sentences.

The processor 334 may input one or more sentences and the determined or changed speech style characteristics into the artificial neural network text-to-speech synthesis model to generate outputted speech data for the one or more sentences that reflects the determined or changed speech style characteristics. According to an embodiment, the artificial neural network text-to-speech synthesis model may be configured to use a plurality of reference sentences and a plurality of reference speech styles to output speech data corresponding to the input text and the input speech style, or to generate a synthetic speech. The processor 334 may generate the synthetic speech based on the generated output speech data, and generate audio content including the synthetic speech. For example, the processor 334 may be configured to input the generated output speech data to a post-processing processor and/or a vocoder to output a synthetic speech. The processor 334 may store the generated audio content in the memory 332 of the synthetic speech generation system 230.

The processor 334 may transmit the generated synthetic speech or audio content to a plurality of user terminals 210 or other systems through the communication module 336. For example, the processor 334 may transmit, through the communication module 336, the generated audio content to the user terminal 210 that made the request to stream, and cause the generated audio content to be streamed from the user terminal 210. As another example, the processor 334 may transmit, through the communication module 336, the generated audio content to the user terminal 210 that made the request to download, and cause the generated audio content to be stored in the memory 312 of the user terminal 210. According to another embodiment, the processor 334 may mix the generated an audio content with a video content. Here, the video content may be received from the plurality of user terminals 210, other systems, or the memory 332 of the synthetic speech generation system 230.

The processor 334 may inspect the outputted speech data for one or more sentences or the generated synthetic speech. According to an embodiment, the processor 334 may be configured to operate a speech recognizer to determine whether the outputted speech data or the synthetic speech is properly generated. For example, the speech recognizer may be configured to not only inspect the text information recognized from the synthetic speech, but also inspect whether the emotions, prosody and the like of the synthetic speech are appropriate. Based on the inspected result, the processor 334 may determine whether or not the speech style characteristic set for one or more sentences and/or the role is appropriate. In addition, the processor 334 may recommend new role candidates or speech style characteristic candidates for one or more sentences and provide them to the user terminal 210, and the processor 314 of the user terminal 210 may select one of the recommended role candidates or speech style characteristic candidates to determine the role or speech style characteristic for the corresponding sentence.

Figure 4:
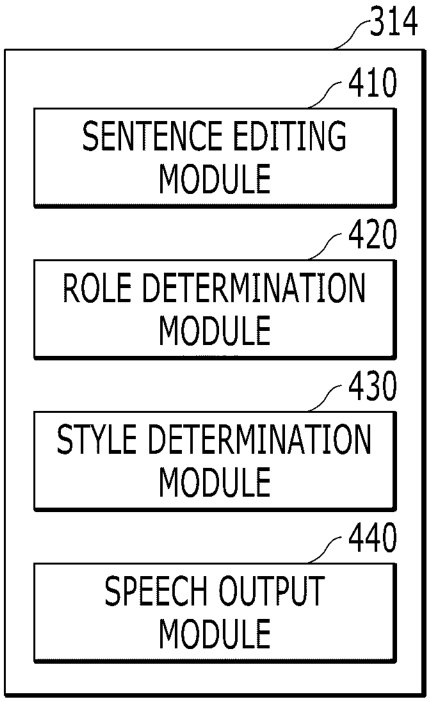
FIG. 4 is a block diagram illustrating an internal configuration of a processor of the user terminal according to an embodiment of the present disclosure.

FIG. 4 is a block diagram showing an internal configuration of the processor 314 of the user terminal 210 according to an embodiment of the present disclosure. As shown, the processor 314 may include a sentence editing module 410, a role determination module 420, a style determination module 430, and a speech output module 440.

The sentence editing module 410 may divide a plurality of sentences into one or more sets of sentences. According to an embodiment, the sentence editing module 410 may receive an input for sentence division (e.g., an enter input following the text input) through the user interface to divide a plurality of sentences into one or more sets of sentences.

The role determination module 420 may determine a role corresponding to the divided one or more sets of sentences. According to an embodiment, the role determination module 420 may determine or change the role corresponding to one or more sets of sentences based on an input to select the roles corresponding to one or more sets of sentences which is received through the user interface. In this case, a predetermined speech style characteristic corresponding to the determined or changed role may be determined for one or more sets of sentences.

The style determination module 430 may determine the speech style characteristic corresponding to one or more received sentences. According to an embodiment, the style determination module 430 may determine or change the speech style characteristics corresponding to one or more sets of sentences based on an input to select the speech style characteristics corresponding to one or more sentences which is received through the user interface.

As used herein, the role determination module 420 and the style determination module 430 are shown as being included in the processor 314, but embodiments are not limited thereto, and they may be configured to be included in the processor 334 of the synthetic speech generation system 230. In addition, while FIG. 4 shows the role determination module 420 and the style determination module 430 as separate modules, embodiments are not limited thereto. For example, the role determination module 420 may be implemented to be included in the style determination module 430. The speech style characteristics determined through the role determination module 420 and the style determination module 430 may be provided to the synthetic speech generation system together with the one or more corresponding sentences. The synthetic speech generation system may input the one or more received sentences and the speech style characteristic corresponding thereto to the artificial neural network text-to-speech synthesis model, to output the speech data from the artificial neural network text-to-speech synthesis model. Then, a synthetic speech may be generated based on the outputted speech data. The generated synthetic speech may be outputted through the speech output module 450.

After the synthetic speech is outputted by the speech output module 450, the user may listen to the outputted synthetic speech in advance, and edit or change the corresponding sentence, the role of the sentence, and/or the speech style characteristic of the sentence. According to an embodiment, the sentence editing module 410 may receive an input indicating to edit an inappropriate sentence in the outputted synthetic speech. In another embodiment, the role determination module 420 may change a set role by selecting at least a part of one or more sets of sentences in the outputted synthetic speech, for which the role selection is not suitable. According to another embodiment, the style determination module 430 may change a set speech style characteristic by selecting one or more sentences in the outputted speech, for which the speech style characteristic is not suitable.

Figure 5:
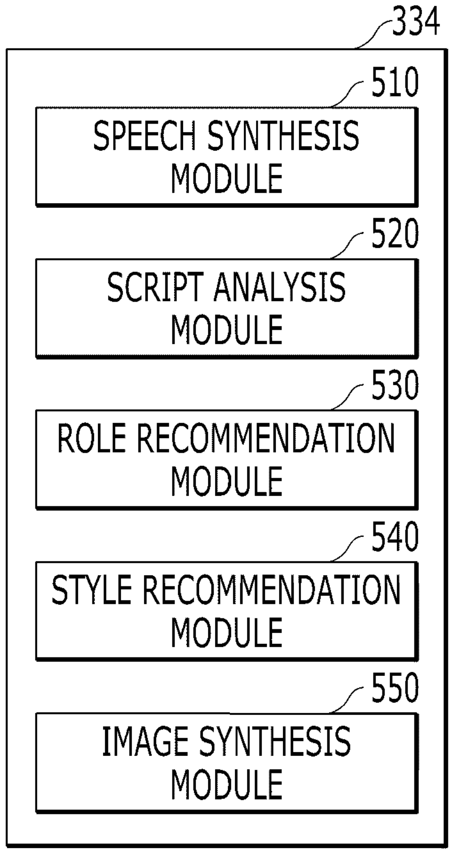
FIG. 5 is a block diagram illustrating an internal configuration of a processor of the synthetic speech generation system according to an embodiment of the present disclosure.

FIG. 5 is a block diagram showing an internal configuration of the processor 334 of the synthetic speech generation system 230 according to an embodiment of the present disclosure. As shown, the processor 334 may include a speech synthesis module 510, a script analysis module 520, a role recommendation module 530, a style recommendation module 540, and an image synthesis module 550. Each of the modules operated by the processor 334 may be configured to communicate with each of the modules operated by the processor 314 of FIG. 4.

The speech synthesis module 510 may input one or more sentences and the determined or changed speech style characteristics into the artificial neural network text-to-speech synthesis model to generate the outputted speech data reflecting the determined or changed speech style characteristics. The speech synthesis module 510 may generate a synthetic speech based on the generated output speech data. The generated synthetic speech may be provided to the user terminal and output to the user.

The script analysis module 520 may receive one or more sentences and analyze the one or more sentences using the natural language processing or the like. According to an embodiment, the script analysis module 520 may divide a plurality of sentences that are received based on the analysis result into one or more sets of sentences. In addition, the script analysis module 520 may analyze the divided one or more sets of sentences, and group the divided one or more sets of sentences based on the analysis result. The divided one or more sets of sentences and/or the grouped one or more sets of sentences may be provided to the user terminal and outputted through the user interface.

The role recommendation module 530 may recommend the role candidates corresponding to each of the one or more sets of sentences or grouped sets of sentences based on the analysis result of the script analysis module 520. The role recommendation module 530 may output the role candidates corresponding to each of the one or more sets of sentences or grouped sets of sentences through the user interface, and receive a user's response thereto. The role recommendation module 530 may determine the roles corresponding to each of the divided one or more sets of sentences or grouped sets of sentences according to the user's response to the role candidates received through the user interface. Alternatively, the role recommendation module 530 may automatically select the roles corresponding to each of the one or more sets of sentences or grouped sets of sentences based on the analysis result of the script analysis module 520. The automatically selected roles may be outputted to the user through the user interface.

The style recommendation module 540 may recommend the speech style characteristic candidates for the one or more sentences or one or more sets of sentences based on the analysis result of the script analysis module 520. The style recommendation module 540 may output the speech characteristic candidates recommended through the user interface and receive a user's response thereto. The style recommendation module 540 may determine the speech style characteristics corresponding to each of the divided one or more sets of sentences or grouped sets of sentences according to the user's response to the speech style characteristic candidates received through the user interface. Alternatively, the style recommendation module 540 may automatically determine the speech style characteristics corresponding to the received one or more sentences, one or more sets of sentences, or grouped sets of sentences, based on the analysis result of the script analysis module 520.

The image synthesis module 550 may mix or dub the synthetic speech and/or audio content including the synthetic speech generated by the speech synthesis module 510, to the video content. Here, the video content may be received from the user terminal 210, other systems, or the memory 332 of the synthetic speech generation system 230. According to an embodiment, the audio content is content related to the received video content, and may be generated in accordance with the playback speed of the video content. For example, the audio content may be mixed or dubbed in accordance with the timing at which a person in the video content speaks.

Figure 6:
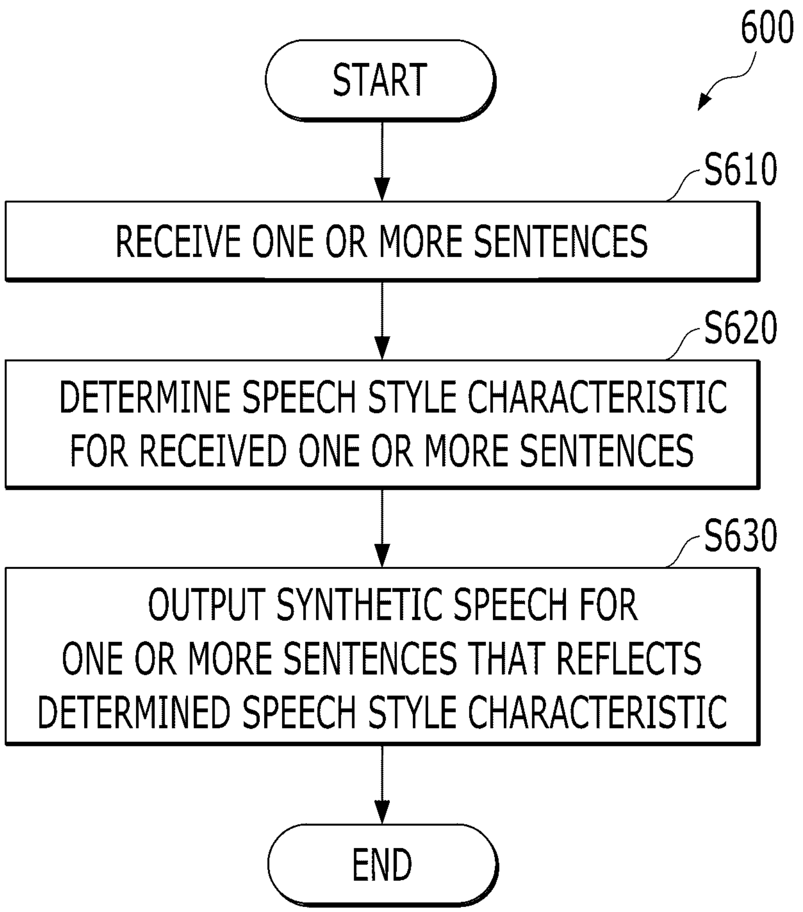
FIG. 6 is a flowchart illustrating a method for generating synthetic speech according to an embodiment of the present disclosure.

FIG. 6 is a flowchart illustrating a method 600 for generating synthetic speech according to an embodiment of the present disclosure. The method 600 for generating synthetic speech may be performed by the user terminal and/or the synthetic speech generation system. As shown, the method 600 for generating synthetic speech may be initiated at S610 by receiving one or more sentences.

Then, at S620, the speech style characteristics for the received one or more sentences may be determined. According to an embodiment, in response to a user input through one or more user interfaces, at least a part of the one or more sentences outputted through the user interfaces may be selected, and the speech style characteristics for at least a part selected sentences may be determined. In another embodiment, the synthetic speech generation system may recommend or determine the speech style characteristics for one or more sentences and provide them to the user terminal, and the user terminal may determine the speech style characteristics for the corresponding sentences based on the received speech style characteristics.

Next, at S630, the synthetic speeches for the one or more sentences reflecting the speech style characteristics may be outputted. Here, the one or more sentences and the speech style characteristic may be inputted to the artificial neural network text-to-speech synthesis model and the synthetic speech may be generated based on the speech data outputted from the artificial neural network text-to-speech synthesis model. For example, the synthetic speech may be included in the user terminal or may be outputted through a connected speaker.

Figure 7:
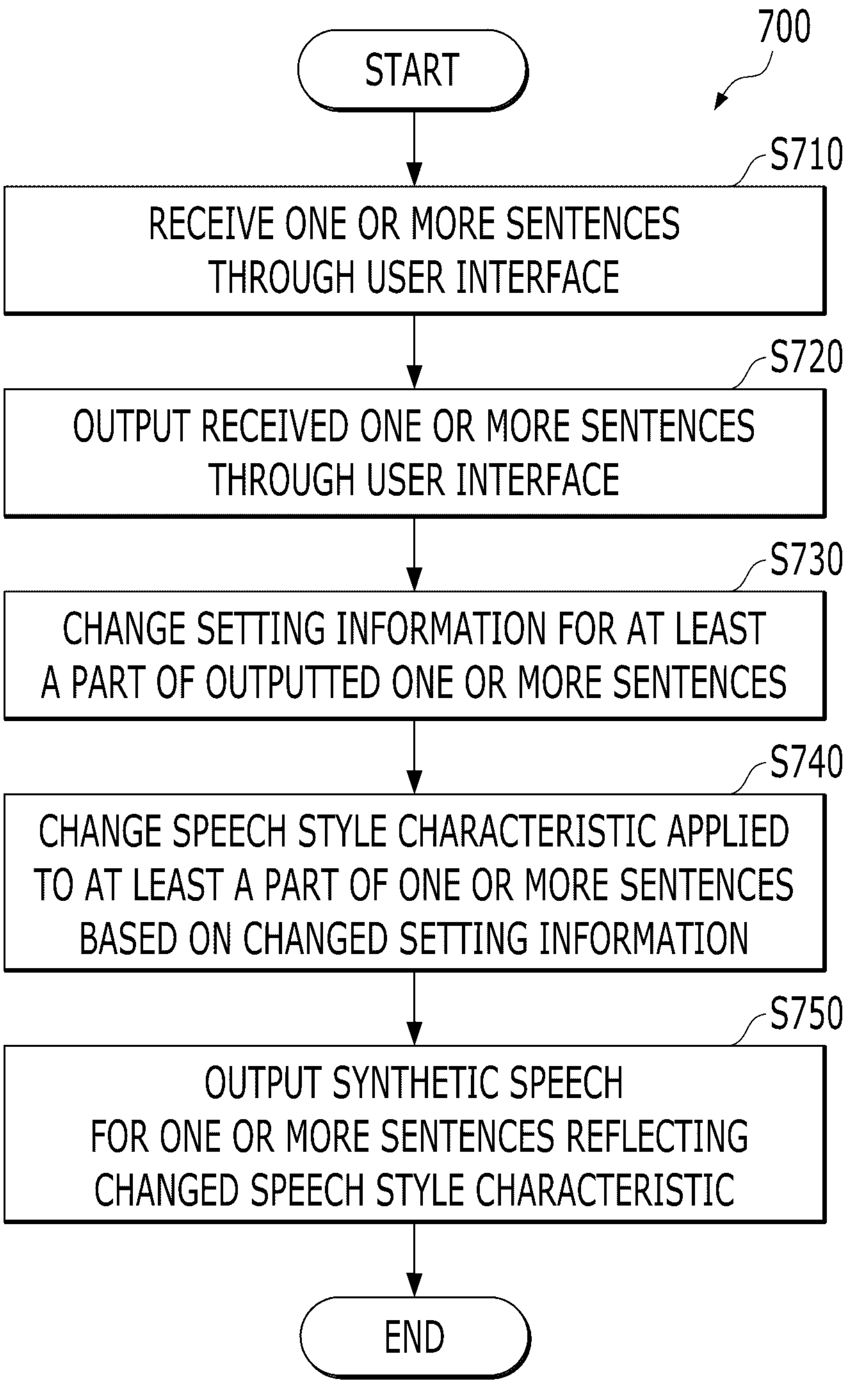
FIG. 7 is a flowchart illustrating changing the setting information with a method for generating synthetic speech according to an embodiment of the present disclosure.

FIG. 7 is a flowchart illustrating changing the setting information with a method 700 for generating synthetic speech according to an embodiment of the present disclosure. Changing the setting information with the method 700 for generating synthetic speech may be performed by the user terminal and/or the synthetic speech generation system. As shown, changing the setting information with the method 700 for generating synthetic speech may be initiated at S710 by receiving one or more sentences through the user interface.

Then, at S720, the received one or more sentences may be outputted through the user interface. Next, at S730, the setting information for at least a part of the outputted one or more sentences may be changed. According to an embodiment, the setting information for visual representation of at least a part of the one or more sentences may be changed based on a user input through an interface. For example, by changing a font, a font style, a font color, a font size, a font effect, an underline, an underline style, or the like of the part of the one or more sentences, the setting information for the part of the one or more sentences may be changed.

Next, at S740, the speech style characteristic applied to at least a part of the one or more sentences may be changed based on the changed setting information. That is, the speech style characteristic corresponding to the setting information may be applied to at least a part of the one or more sentences. Next, at S750, the synthetic speeches for one or more sentences reflecting the changed speech style characteristics may be outputted. Here, the one or more sentences and the changed speech style characteristics may be inputted to the artificial neural network text-to-speech synthesis model and the synthetic speech may be changed based on the speech data outputted from the artificial neural network text-to-speech synthesis model.

Figure 8:
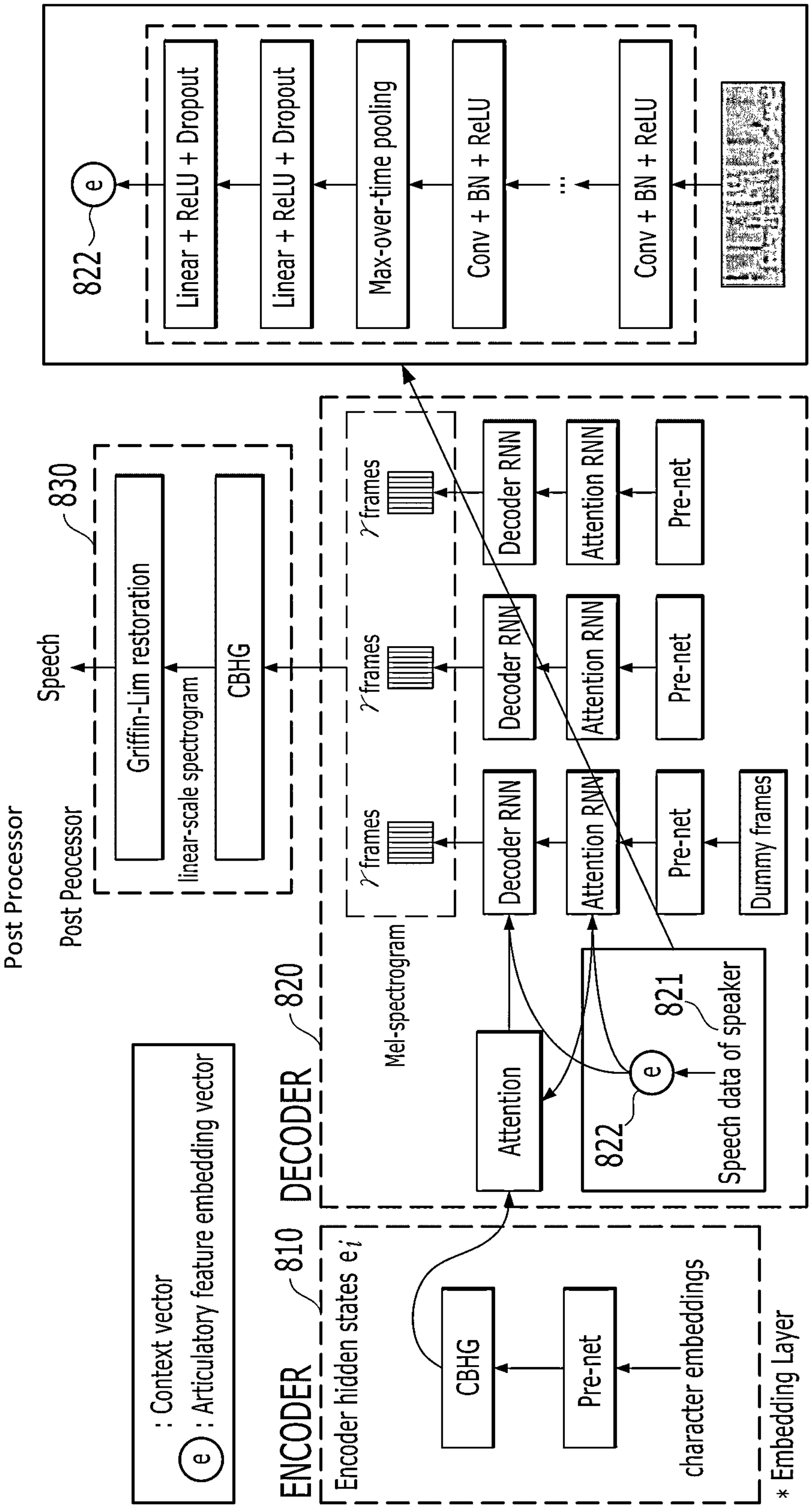
FIG. 8 is a diagram illustrating a configuration of an artificial neural network-based text-to-speech synthesis device, and a network for extracting an embedding vector that can distinguish each of a plurality of speakers according to an embodiment of the present disclosure.

FIG. 8 is a diagram illustrating a configuration of an artificial neural network-based text-to-speech synthesis device, and a network for extracting an embedding vector 822 that can distinguish each of a plurality of speakers and/or speech style characteristics according to an embodiment of the present disclosure. The text-to-speech synthesis device may be configured to include an encoder 810, a decoder 820, and a post-processing processor 830. The text-to-speech synthesis device may be configured to be included in the synthetic speech generation system.

According to an embodiment, the encoder 810 may receive character embeddings for the input text, as shown in FIG. 8. According to another embodiment, the input text may include at least one of word, phrase, or sentence used in one or more languages. For example, the encoder 810 may receive one or more sentences as the input text through the user interface. When the input text is received, the encoder 810 may divide the received input text into a syllable unit, a character unit, or a phoneme unit. According to another embodiment, the encoder 810 may receive the input text divided into the syllable unit, the character unit, or the phoneme unit. Then, the encoder 810 may convert and generate the input text into the character embeddings.

The encoder 810 may be configured to generate the text as pronunciation information. In an embodiment, the encoder 810 may pass the generated character embeddings through a pre-net including a fully-connected layer. In addition, the encoder 810 may provide the output from the pre-net to a CBHG module to output encoder hidden states $e_i$ as shown in FIG. 8. For example, the CBHG module may include a 1D convolution bank, a max pooling, a highway network, and a bidirectional gated recurrent unit (GRU).

In another embodiment, when the encoder 810 receives the input text or the divided input text, the encoder 810 may be configured to generate at least one embedding layer. According to an embodiment, the at least one embedding layer of the encoder 810 may the character embeddings on the basis of the input text divided in the syllable unit, character unit, or phoneme unit. For example, the encoder 810 may use a machine learning model (e.g., a probability model, an artificial neural network, or the like) that has already been trained, to obtain the character embeddings on the basis of the divided input text. Furthermore, the encoder 810 may update the machine learning model while performing machine learning. When the machine learning model is updated, the character embeddings for the divided input text may also be changed. The encoder 810 may pass the character embeddings through a deep neural network (DNN) module composed of the fully-connected layers. The DNN may include a general feedforward layer or a linear layer. The encoder 810 may provide the output of the DNN to a module including at least one of a convolutional neural network (CNN) or a recurrent neural network (RNN), and generate hidden states of the encoder 810. While the CNN may capture local characteristics according to the size of the convolution kernel, the RNN may capture long term dependency. The hidden states of the encoder 810, that is, the pronunciation information for the input text may be provided to the decoder 820 including the attention module, and the decoder 820 may be configured to generate such pronunciation information into a speech.

The decoder 820 may receive the hidden states $e_i$ of the encoder from the encoder 810. In an embodiment, as shown in FIG. 8, the decoder 820 may include an attention module, the pre-net composed of the fully-connected layers, and a gated recurrent unit (GRU), and may include an attention recurrent neural network (RNN) and a decoder RNN including a residual GRU. In this example, the attention RNN may output information to be used in the attention module. In addition, the decoder RNN may receive position information of the input text from the attention module. That is, the position information may include information regarding which position in the input text is being converted into a speech by the decoder 820. The decoder RNN may receive information from the attention RNN. The information received from the attention RNN may include information regarding which speeches the decoder 820 has generated up to the previous time-step. The decoder RNN may generate the next output speech following the speeches that have been generated so far. For example, the output speech may have a mel spectrogram form, and the output speech may include r frames.

In another embodiment, the pre-net included in the decoder 820 may be replaced with the DNN composed of the fully-connected layers. In this example, the DNN may include at least one of a general feedforward layer or a linear layer.

In addition, like the encoder 810, the decoder 820 may use a database existing as a pair of information related to the input text, speaker and/or speech style characteristics, and speech signal corresponding to the input text, in order to generate or update the artificial neural network text-to-speech synthesis model. The decoder 820 may be trained with the information related to the input text, speaker, and/or speech style characteristics as the inputs of to the artificial neural network, respectively, and the speech signals corresponding to the input text as the correct answer. The decoder 820 may apply the information related to the input text, speaker and/or speech style characteristics to the updated single artificial neural network text-to-speech synthesis model, and output a speech corresponding to the speaker and/or speech style characteristics.

In addition, the output of the decoder 820 may be provided to the post-processing processor 830. The CBHG of the post-processing processor 830 may be configured to convert the mel-scale spectrogram of the decoder 820 into a linear-scale spectrogram. For example, the output signal of the CBHG of the post-processing processor 830 may include a magnitude spectrogram. The phase of the output signal of the CBHG of the post-processing processor 830 may be restored through the Griffin-Lim algorithm and subjected to the Inverse Short-Time Fourier Transform. The post-processing processor 830 may output a speech signal in a time domain.

Alternatively, the output of the decoder 820 may be provided to a vocoder (not shown). According to an embodiment, for the purpose of text-to-speech synthesis, the operations of the DNN, the attention RNN, and the decoder RNN may be repeatedly performed. For example, the r frames obtained in the initial time-step may become the inputs of the subsequent time-step. Also, the r frames output in the subsequent time-step may become the inputs of the subsequent time-step that follows. Through the process described above, speeches may be generated for all units of the text.

According to an embodiment, the text-to-speech synthesis device may obtain the speech of the mel-spectrogram for the whole text by concatenating the mel-spectrograms for the respective time-steps in chronological order. The vocoder may predict the phase of the spectrogram through the Griffin-Lim algorithm. The vocoder may output the speech signal in time domain using the Inverse Short-Time Fourier Transform.

The vocoder according to another embodiment of the present disclosure may generate the speech signal from the mel-spectrogram based on a machine learning model. The machine learning model may include a model trained about the correlation between the mel spectrogram and the speech signal. For example, the vocoder may be implemented by using the artificial neural network model such as WaveNet, WaveRNN, and WaveGlow, which has the mel spectrogram or linear prediction coefficient (LPC), line spectral pair (LSP), line spectral frequency (LSF), or pitch period as the inputs, and has the speech signals as the outputs.

The artificial neural network-based text-to-speech synthesis device may be trained using a large database existing as the text-speech signal pair. A loss function may be defined by comparing the output to the text that is entered as the input, with the corresponding target speech signal. The text-to-speech synthesis device may learn the loss function through the error back propagation algorithm to finally obtain a single artificial neural network text-to-speech synthesis model that outputs a desired speech when any text is input.

The decoder 820 may receive the hidden states $e_i$ of the encoder from the encoder 810. According to an embodiment, the decoder 820 of FIG. 8 may receive speech data 821 corresponding to a specific speaker and/or a specific speech style characteristic. Here, the speech data 821 may include data indicative of a speech input from a speaker within a predetermined time period (a short time period, e.g., several seconds, tens of seconds, or tens of minutes). For example, the speaker's speech data 821 may include speech spectrogram data (e.g., log-mel-spectrogram). The decoder 820 may obtain an embedding vector 822 indicative of the speaker and/or speech style characteristics based on the speaker's speech data. According to another embodiment, the decoder 820 of FIG. 8 may receive a one-hot speaker ID vector or speaker vector for each speaker, and based on this, may obtain the embedding vector 822 indicative of the speaker and/or speech style characteristic. The obtained embedding vector may be stored in advance, and when a specific speaker and/or speech style characteristic is requested through the user interface, a synthetic speech may be generated using the embedding vector corresponding to the requested information among the previously stored embedding vectors. The decoder 820 may provide the obtained embedding vector 822 to the attention RNN and the decoder RNN.

The text-to-speech synthesis device shown in FIG. 8 may provide a plurality of previously stored embedding vectors corresponding to a plurality of speakers and/or a plurality of speech style characteristics. When the user selects a specific role or a specific speech style characteristic through the user interface, a synthetic speech may be generated using the embedding vector corresponding thereto. Alternatively, in order to generate a new speaker vector, the text-to-speech synthesis device may provide a TTS system that can immediately generate a speech of a new speaker, that is, that can adaptively generate the speech of the new speaker without further training the TTS model or manually searching for the speaker embedding vectors. That is, the text-to-speech synthesis device may generate speeches that are adaptively changed for a plurality of speakers. According to an embodiment, in FIG. 8, it may be configured such that, when synthesizing a speech for the input text, the embedding vector 822 extracted from the speech data 821 of a specific speaker may be inputted to the decoder RNN and the attention RNN. A synthetic speech may be generated, which reflects at least one characteristic from among a vocal characteristic, a prosody characteristic, an emotion characteristic, or a tone and pitch characteristic included in the embedding vector 822 of the specific speaker.

The network shown in FIG. 8 may include a convolutional network and max over time pooling, and may receive a log-Mel-spectrogram and extract a fixed-dimensional speaker embedding vector as a speech sample or a speech signal. In this example, the speech sample or the speech signal is not necessarily the speech data corresponding to the input text, and any selected speech signal may be used.

In such a network, any spectrogram may be inserted into this network because there are no restrictions on the use of the spectrograms. In addition, through this, the embedding vector 822 indicative of a new speaker and/or a new speech style characteristic may be generated through the immediate adaptation of the network. The input spectrogram may have various lengths, but for example, a fixed dimensional vector having a length of 1 with respect to the time axis may be inputted to the max-over-time pooling layer located at the end of the convolutional layer.

FIG. 8 shows a network including the convolutional network and the max over time pooling, but a network including various layers can be established to extract the speaker and/or speech style characteristics. For example, a network may be implemented to extract characteristics using the recurrent neural network (RNN), when there is a change in the speech characteristic pattern over time, such as an intonation, among the speaker and/or speech style characteristics.

Figure 9:
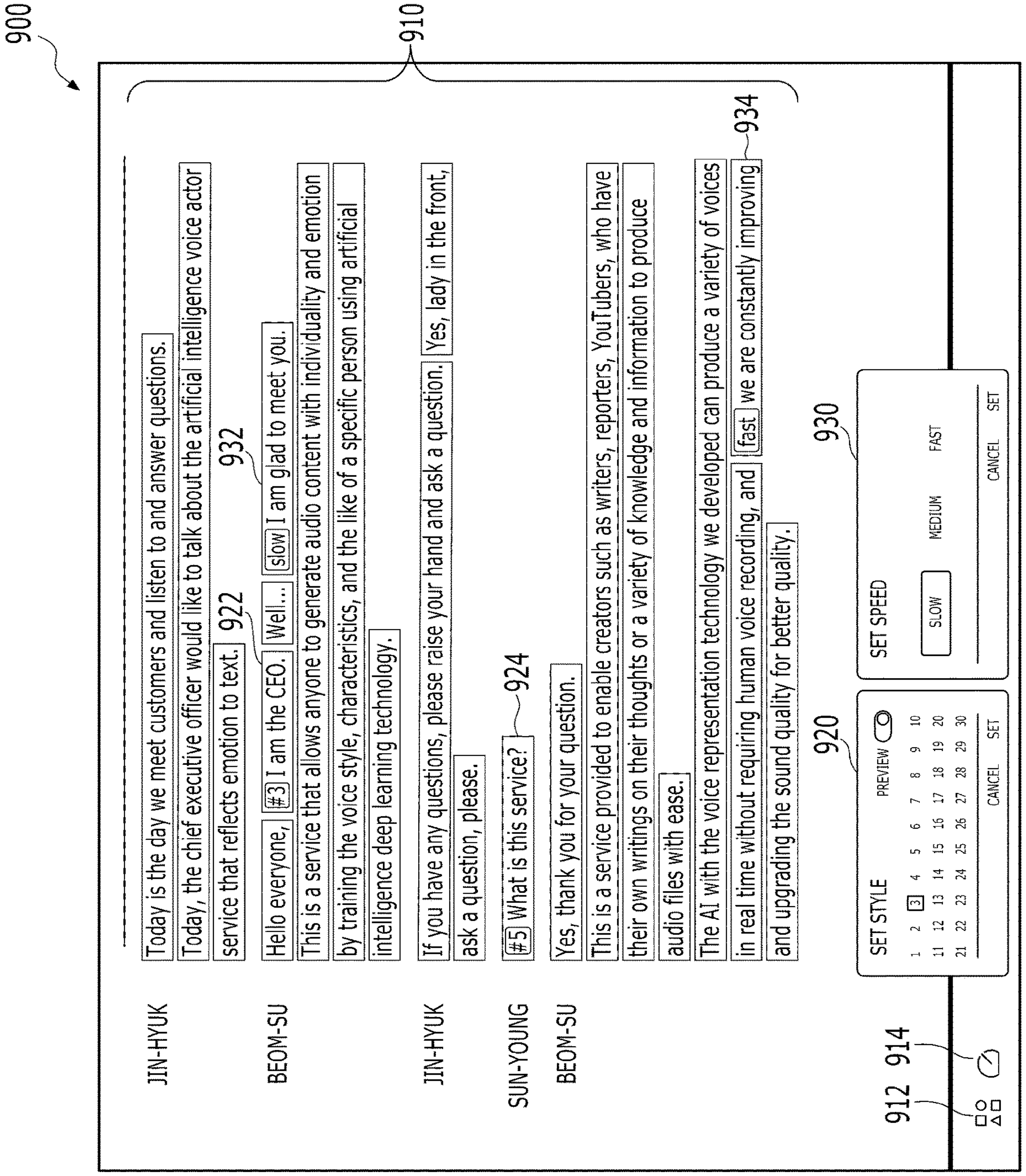
FIG. 9 is a diagram illustrating an exemplary screen of a user interface for providing a speech synthesis service according to an embodiment of the present disclosure.

FIG. 9 is a diagram illustrating an exemplary screen 900 of the user interface for providing a speech synthesis service according to an embodiment of the present disclosure. The speech style characteristics may be determined for the received one or more sentences 910. The speech style characteristics may be determined or changed based on the setting information for at least a part of the one or more sentences.

According to an embodiment, when one is selected from among the plurality of sentences 910 received through the user interface and an icon 912 associated with the speech style is clicked, a speech style setting interface 920 may be displayed. According to the user's selection of one from among a plurality of speech styles included in the speech style setting interface 920, the speech style selected for the given sentence may be determined. For example, when the user selects a sentence 922 "I am the CEO." and clicks an icon 912 associated with the speech style list, the speech style setting interface 920 may be displayed. When the user selects a portion corresponding to "3" in the speech style setting interface 920, "#3" may be determined as the setting information in the sentence 922 "I am the CEO.". In addition, the speech style characteristic for the sentence 922 "I am the CEO." may be determined or set as the speech style characteristic "awkwardly" which is a predetermined speech style characteristic corresponding to "#3". As another example, when the user selects a sentence 924 "What is this service?" and clicks the icon 912 associated with the speech style list, the speech style setting interface 920 may be displayed. By selecting a portion corresponding to "5" in the speech style setting interface 920, "#5" may be determined as the setting information for the sentence 924 "What is this service?". Further, the speech style characteristic of the sentence 924 "What is this service?" may be determined as a speech style characteristic "with confidence" corresponding to "#5".

According to another embodiment, when one is selected from among a plurality of sentences 910 received through the user interface and an icon 914 associated with the speech speed is clicked, the speech speed setting interface 930 may be displayed. According to a user's response to one of a plurality of speech speeds included in the speech speed setting interface 930, the speech style selected for the selected sentence may be determined. For example, when the user selects a sentence 932 "I am glad to meet you." and clicks the icon 914 associated with the speech speed, the speech speed setting interface 930 may be displayed. By selecting "slow" in the speech speed setting interface 930, "slow" may be determined as the setting information for the sentence 932 "I am glad to meet you.", and the speech style characteristic for the sentence 932 "I am glad to meet you" may be determined as a predetermined slow speed style characteristic. As another example, when the user selects a sentence 934 "We are constantly improving and upgrading sound quality for better quality.", and clicks the icon 912 associated with the speech speed, the speech speed setting interface 930 may be displayed. By selecting "fast" in the speech speed setting interface 930, "fast" may be determined as the setting information for the sentence 934 "We are constantly improving and upgrading sound quality for better quality.", and the speech style characteristic for the sentence 934 "We are constantly improving and upgrading sound quality for better quality." may be determined as a predetermined fast style characteristic. Note that the speed of the selected sentence and/or portion of the sentence may be changed by the user and the synthetic speech may be generated accordingly, and the configuration regarding this will be described in detail with reference to FIG. 13.

FIG. 9 shows an operation in which the speech style characteristic is determined according to an input through the user interface, but embodiment is not limited thereto, and in the synthetic speech generation system, the speech style characteristics may be automatically determined according to the analyzed result using the natural language processing or the like. For example, the synthetic speech generation system may recognize a sentence "Well . . . " and determine the speech style characteristic "hesitantly" for the next sentence, that is, the sentence 932 "I'm glad to meet you". In this case, unlike FIG. 9, "hesitantly" may be displayed in front of the sentence 932 "I am glad to meet you."

Figure 10:
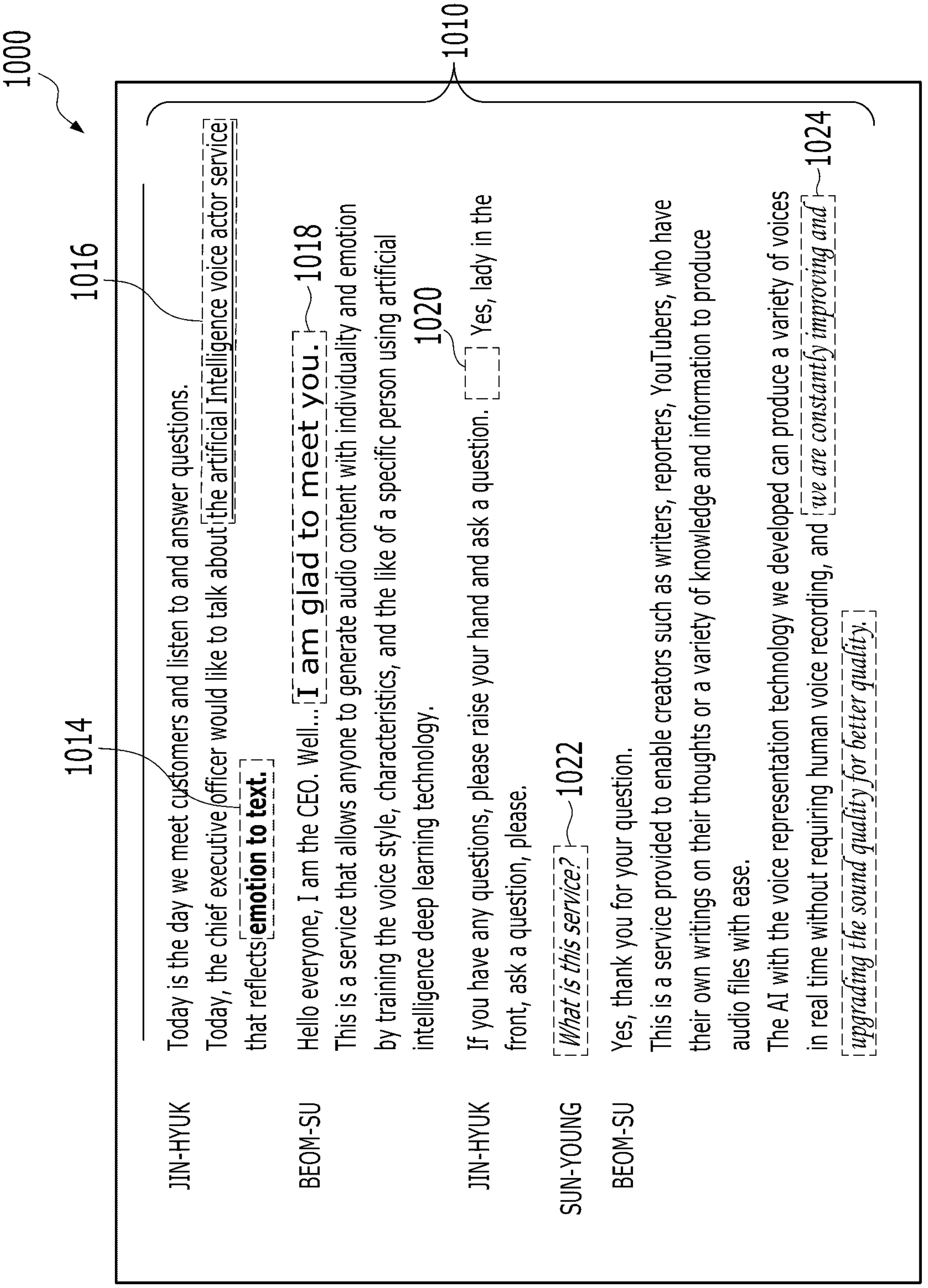
FIG. 10 is a diagram illustrating an exemplary screen of a user interface for providing a speech synthesis service according to an embodiment of the present disclosure.

FIG. 10 is a diagram illustrating an exemplary screen 1000 of the user interface for providing a speech synthesis service according to an embodiment of the present disclosure. The speech style characteristics may be determined for the received one or more sentences 1010. The speech style characteristics may be determined or changed based on the setting information for visual representation of at least a part of one or more sentences. In this case, the setting information for visual representation may include a font, a font style, a font color, a font size, a font effect, an underline, an underline style, or the like. In an embodiment, the setting information for visual representation may be determined or changed according to a user input. According to another embodiment, the synthetic speech generation system may analyze one or more sentences and automatically determine the setting information for visual representation of the one or more sentences. For example, as shown in the user interface screen 100, a font thickness of a sentence 1014 "emotion to text" may be determined in bold, and the speech style characteristic for the sentence 1014 "emotion to text" may be determined to be a bold speech style characteristic. As another example, an underline may be added to the sentence 1016 "artificial intelligence speech actor service", and the speech style characteristic for the sentence 1016 of the "artificial intelligence voice actor service" may be determined to be an emphasizing speech style characteristic. As another example, the space between letters in the sentence 1018 "I am glad to meet you" may be determined to be wide, and the speech style characteristic of the sentence 1018 "I am glad to meet you" may be determined to be a slow-speed style characteristic. As another example, the sentence 1022 "What is this service?" may be determined to be tilted, and the speech style characteristic of the sentence 1022 "What is this service?" may be determined to be a sharp-tone speech style characteristic. As another example, the font of the sentence 1024 "We are constantly improving and upgrading the sound quality for better quality." may be determined to be in an archetype, and the speech style characteristic for the sentence 1024 may be determined to be a sincere speech style characteristic.

A silence may be inserted between the plurality of received sentences 1010. The time of silence to be inserted may be determined or changed based on the visual representation indicative of a time period of silence added between a plurality of received sentences. In this case, the visual representation indicative of the time period of silence may mean a space between two sentences among a plurality of sentences. For example, as shown, a space 1020 between the sentences "If you have any questions, please raise your hand and ask a question" and "Yes, lady in the front, ask a question, please." may be determined to be wide, and the silence for a time corresponding to the space 1020 may be added between the two sentences.

Figure 11:
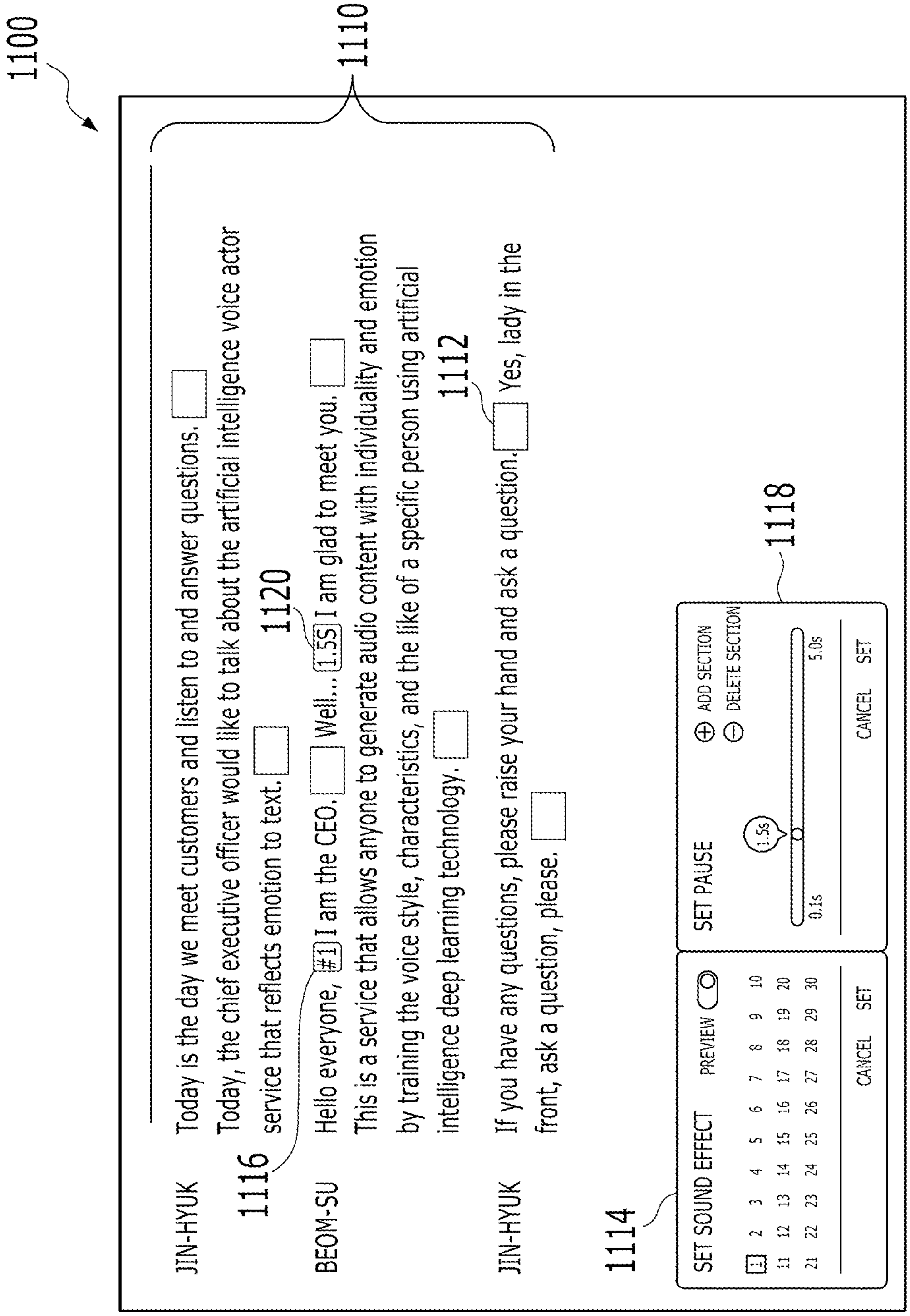
FIG. 11 is a diagram illustrating an exemplary screen of a user interface for providing a speech synthesis service according to an embodiment of the present disclosure.

FIG. 11 is a diagram illustrating an exemplary screen 1100 of the user interface for providing a speech synthesis service according to an embodiment of the present disclosure. An effect may be inserted into one or more received sentences 1110. This effect to be inserted may be determined or changed based on the visual representation indicative of the characteristics of the effect to be inserted. In this example, the effect to be inserted may include sound effects, background music, silence, and the like. For example, as shown, the visual representation may be inserted between a plurality of sentences 1112 received through the user interface. FIG. 11 shows an operation of inserting the effect between a plurality of sentences, but embodiment is not limited thereto. For example, the effect may be inserted before, after, or in the middle of one selected sentence.

When at least one of the plurality of sentences 1112 received through the user interface or one or more received sentences is selected, upon clicking an icon (not shown) associated with the sound effect or an icon (not shown) associated with silence, a sound effect setting interface 1114 or a silence time setting interface 1118 may be displayed. In this example, the icon (not shown) associated with the sound effect or the icon (not shown) associated with silence may be arranged at any position in the user interface. For example, when the user selects between the sentences "Hello everyone," and "I am the CEO." and clicks an icon (not shown)

associated with the sound effect, the sound effect setting interface 1114 may be displayed. When the user selects a portion indicative of "1" in the sound effect setting interface 1114, "#1" may be determined to be the visual representation between the sentences "Hello everyone," and "I am the CEO." Then, the sound effect corresponding to "#1" may be inserted between the two sentences. As another example, when the user selects the sentence "Well . . . " and clicks an icon (not shown) associated with silence, the silence time setting interface 1118 may be displayed. For example, as shown, in the silence time setting interface 1118, when the slide bar is moved to "1.5 s" by the user input, "1.5 s" is determined to be the visual representation that follows the sentence "Well . . . ", and a silence corresponding to the time corresponding to "1.5 s" may be inserted after the sentence "Well . . . ".

FIG. 11 shows an operation of inserting the effect according to the user's input through the user interface, but embodiment is not limited thereto, and the effect may be automatically inserted or the effect sound to be inserted may be recommended according to the result of analysis performed using the natural language processing or the like in the synthetic speech generation system. For example, when the sentence "I am the CEO." is recognized, a "fanfare" sound effect may be inserted in front of the sentence.

Figure 12:
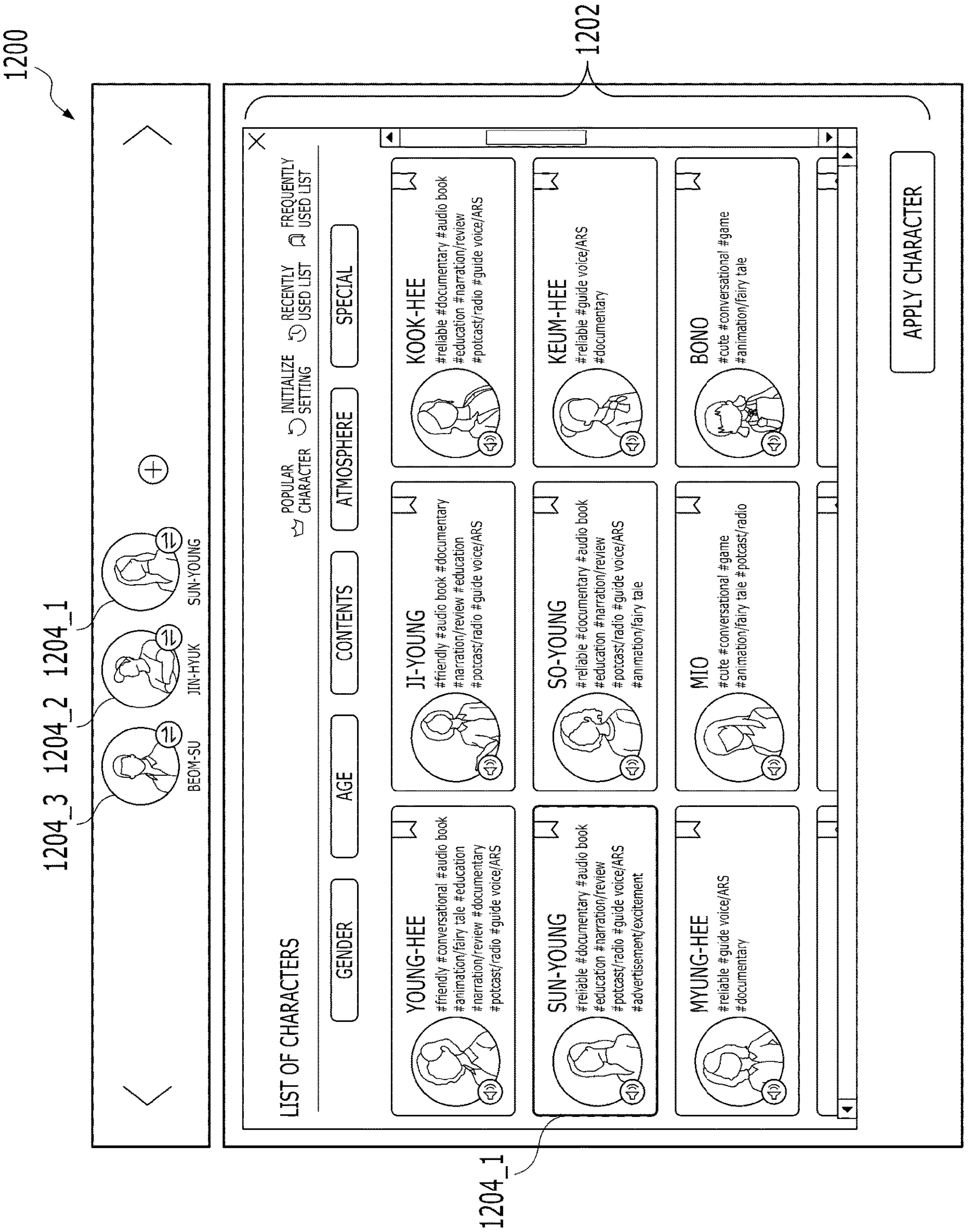
FIG. 12 is a diagram illustrating an exemplary screen of a user interface for providing a speech synthesis service according to an embodiment of the present disclosure.

FIG. 12 is a diagram illustrating an exemplary screen 1200 of the user interface for providing a speech synthesis service according to an embodiment of the present disclosure. A list of roles may be displayed through the user interface. At this time, each role may include a predetermined speech style characteristic.

According to an embodiment, as shown, when any one is selected by the user from the list of roles displayed through the user interface, a role (that is, the role to be used) for one or more sets of sentences may be determined. For example, a list of roles 1202 including "Young-hee", "Ji-young", "Kook-hee", and the like may be displayed as a list of roles through the user interface. By selecting Sun-young 1204_1 from the list of roles and clicking a role application icon, the user may determine it to be the role to be used, together with Jin-hyuk 1204_2 and Beom-su 1204_3 that are already included in the role to be used.

According to another embodiment, a list of roles including the recommended role candidates may be displayed through the user interface, and at least one of the one or more role candidates may be determined to be the role for one or more sets of sentences or grouped sets of sentences. Here, the roles in the list of roles may be listed in the order they are recommended. To this end, the synthetic speech generation system may analyze one or more sets of sentences or grouped sets of sentences, recommend a list of roles including a plurality of roles, and the list of recommended roles may be outputted through the user interface. For example, by selecting one of the recommended role candidates outputted from the user interface, the user may determine the selected role candidate to be the role for the one or more sets of sentences or grouped sets of sentences.

FIG. 12 shows an operation of determining a role to be used according to the user's input through the user interface, but embodiment is not limited thereto, and in the synthetic speech generation system, the role to be used may be automatically determined according to the result of analysis performed using the natural language processing or the like.

Figure 13:
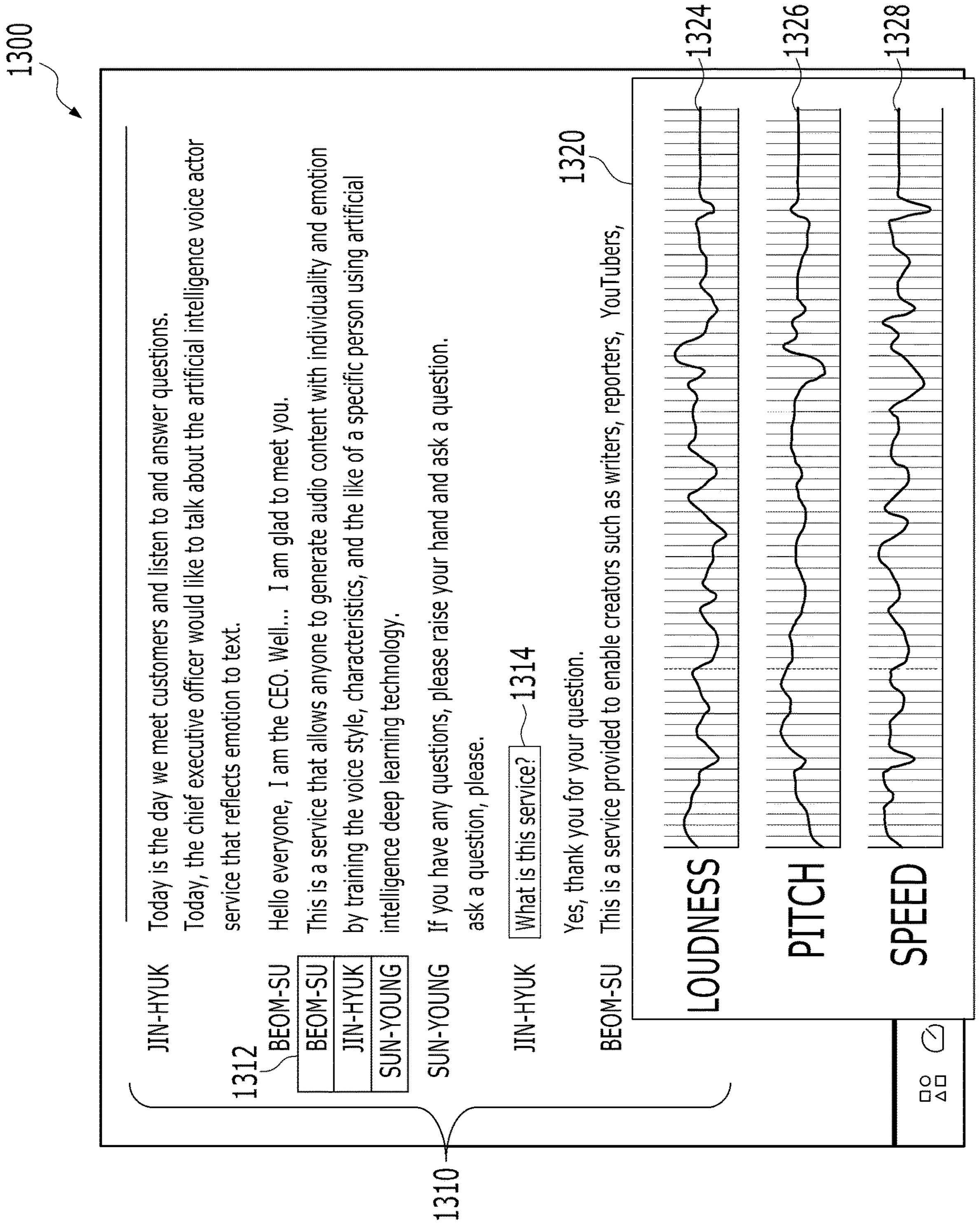
FIG. 13 is a diagram illustrating an exemplary screen of a user interface for providing a speech synthesis service according to an embodiment of the present disclosure.

FIG. 13 is a diagram illustrating an exemplary screen 1300 of the user interface for providing a speech synthesis service according to an embodiment of the present disclosure. The role or speech style characteristic corresponding to one or more sentences 1310 received from the user interface may be determined or changed. In this example, the determining or changing may be referred to as a global style determining or changing. According to an embodiment, the role may be determined or changed for the divided one or more sets of sentences. For example, the user may change the role from "Beom-su" to "Jin-hyuk" that is included in the role to be used, as the role corresponding to the set of sentences including the sentences "Hello everyone, I am the CEO.", "Well . . . ", "I'm glad to meet you", and "This is a service that allows anyone to generate audio content with individuality and emotion by training the voice style, characteristics, and the like of a specific person using artificial intelligence deep learning technology.". To this end, when the user selects an area corresponding to "Beom-su" displayed on the user interface, a list of role candidates 1312 which can be designated or changed to, such as Beom-su, Jin-hyuk, and Sun-young in this example, may be displayed. The order of the roles displayed in the list of role candidates 1312 may be arranged in the order the roles are recommended. In this case, for all the sentences included in the set of sentences, the speech style characteristic may be changed from the speech style characteristic included in the role "Beom-su" to the speech style included in the role "Jin-hyuk".

FIG. 13 shows an operation of determining one of the roles to be used for the set of sentences according to the user's input through the user interface, but embodiment is not limited thereto, and in the synthetic speech generation system, one of the roles to be used for the set of sentences may be automatically determined according to the results of analysis performed using the natural language processing or the like.

According to another embodiment, the speech style characteristics of at least a part of the one or more sentences 1310 may be changed. This change may be referred to as a local style change. In this case, the "part" as used herein may include not only the sentence, but also the phonemes, letters, words, syllables, and the like which are the smaller units divided from the sentence. An interface for changing the speech style characteristic for at least a part of the selected one or more sentences may be outputted. For example, when the user selects the sentence 1314 "What is this service?", an interface 1320 for changing a value indicative of the speech style characteristic may be outputted. As shown in the interface 1320, a loudness setting graph 1324, a pitch setting graph 1326, and a speed setting graph 1328 are shown, but embodiments are not limited thereto, and any information indicative of speech style characteristics may be displayed. Here, in each of the loudness setting graph 1324, the pitch setting graph 1326, and the speed setting graph 1328, the x-axis may represent the size of the unit (e.g., phoneme, letter, word, syllable, sentence, etc.) by which the user can change the speech style, and the y-axis may represent a style value of each unit.

In this embodiment, the speech style characteristic may include a sequential prosody characteristic including prosody information corresponding to at least one unit of a frame, a phoneme, a letter, a syllable, a word, or a sentence in chronological order. In an example, the prosody information may include at least one of information on the volume of the sound, information on the pitch of the sound, information on the length of the sound, information on the pause duration of the sound, or information on the speed of the sound. In addition, the style of the sound may include any form, manner, or nuance that the sound or speech expresses, and may include, for example, tone, intonation, emotion, and the like inherent in the sound or speech. Further, the sequential prosody characteristic may be represented by a plurality of embedding vectors, and each of the plurality of embedding vectors may correspond to the prosody information included in chronological order.

According to an embodiment, the user may modify the y-axis value at a feature point of the x-axis in at least one graph shown in the interface 1320. For example, in order to emphasize a specific phoneme or role in a given sentence, the user may increase the y-axis value at the x-axis point corresponding to the corresponding phoneme or letter in the loudness setting graph 1324. In response, the synthetic speech generation system may receive the changed y-axis value corresponding to the phoneme or letter, and input the speech style characteristic including the changed y-axis value and one or more sentences including the phoneme or letter corresponding thereto to the artificial neural network text-to-speech synthesis model, and generate a synthetic speech based on the speech data outputted from the artificial neural network text-to-speech synthesis model. The synthetic speech generated as described above may be provided to the user through the user interface. To this end, among a plurality of embedding vectors corresponding to the speech style characteristic, the speech synthesis system may change the values of one or more embedding vectors corresponding to the corresponding x-axis point with reference to the changed y-axis value.

According to another embodiment, in order to change the speech style characteristic of at least a part of the given sentence, the user may provide the speech of the user reading the given sentence in a manner desired by the user to the synthetic speech generation system through the user interface. The synthetic speech generation system may input the received speech to an artificial neural network configured to infer the input speech as the sequential prosody characteristic, and output the sequential prosody characteristics corresponding to the received speech. Here, the outputted sequential prosody characteristics may be expressed by one or more embedding vectors. These one or more embedding vectors may be reflected in the graph provided through the interface 1320.

FIG. 13 shows the loudness setting graph 1324, the pitch setting graph 1326, and the speed setting graph 1328 included in the interface 1320 for changing speech style characteristics, but embodiment is not limited thereto, and a graph of the mel scale spectrogram corresponding to the speech data for a synthetic speech may also be shown.

What is claimed is:

1. A method for generating a synthetic speech for text through a user interface, the method comprising:

receiving a plurality of sentences;

displaying the plurality of sentences in a first font style on the user interface;

determining a speech style characteristic for the received plurality of sentences, wherein the determining the speech style characteristic for the received plurality of sentences includes determining the speech style characteristic for a set of sentences among the plurality of sentences as a specific speech style characteristic;

receiving a change of a font style of text for a part of the set of sentences being displayed from the first font style to a second font style through the user interface;

in response to receiving the change of the font style of text for the part of the set of sentences from the first font style to the second font style through the user interface: displaying the text for the part of the set of sentences in the second font style; and modifying the part of detailed characteristics of the specific speech style characteristic for the part of the set of sentences to obtain a modified specific speech style characteristic based on the change of the font style, wherein other part of the detailed characteristics of the specific speech style characteristic for remaining part of the set of sentences are maintained;

obtaining an embedding vector related to the specific speech style characteristics;

obtaining another embedding vector related to the modified specific speech style characteristics;

outputting a synthetic speech for the part of the set of sentences based on the another embedding vector and another character embeddings generated based on the part of the set of sentences; and outputting another synthetic speech for the remaining part of the set of sentences based on the embedding vector and character embeddings generated based on the remaining part of the set of sentences, wherein the determined speech style characteristic for the set of sentences includes the modified detailed characteristics for the part of the set of sentences and original detailed characteristics for other part of the set of sentences, and the plurality of sentences and the determined speech style characteristic are inputted to an artificial neural network text-to-speech synthesis model and the synthetic speech is generated based on speech data outputted from the artificial neural network text-to-speech synthesis model.

2. The method of claim 1, further comprising outputting the received plurality of sentences, wherein the determining the speech style characteristics of the received plurality of sentences includes changing setting information for at least a part of the outputted plurality of sentences, the speech style characteristic applied to the part of the plurality of sentences is changed based on the changed setting information, and the part of the plurality of sentences and the changed speech style characteristic are inputted to the artificial neural network text-to-speech synthesis model and the synthetic speech is changed based on speech data outputted from the artificial neural network text-to-speech synthesis model.

3. The method of claim 2, wherein the changing the setting information for the part of the outputted plurality of sentences includes changing setting information for visual representation of the part of the outputted plurality of sentences.

4. The method of claim 2, further comprising adding a visual representation indicative of characteristic of an effect to be inserted between the plurality of sentences, wherein the synthetic speech includes a sound effect generated based on the characteristic of the effect included in the added visual representation.

5. The method of claim 4, wherein the effect to be inserted between the plurality of sentences includes a silence, and the adding the visual representation indicative of the characteristic of the effect to be inserted between the plurality of sentences includes adding a visual representation indicative of a time of the silence to be inserted between the plurality of sentences.

6. The method of claim 1, further comprising dividing the plurality of sentences into one or more sets of sentences, wherein the determining the speech style characteristic for the received plurality of sentences includes:

determining a role corresponding to the divided one or more sets of sentences; and setting a predetermined speech style characteristic corresponding to the determined role.

7. The method of claim 6, wherein an analysis result is generated by analyzing the divided one or more sets of sentences using natural language processing, and the determining the role corresponding to the divided one or more sets of sentences includes:

outputting one or more role candidates recommended based on the analysis result of the one or more sets of sentences; and selecting at least a part of the outputted one or more role candidates.

8. The method of claim 7, wherein the divided one or more sets of sentences are grouped based on the analysis result, and the determining the role corresponding to the divided one or more sets of sentences includes:

outputting one or more role candidates corresponding to each of the grouped sets of sentences recommended based on the analysis result; and selecting at least a part of the outputted one or more role candidates.

9. The method of claim 7, wherein the determining the speech style characteristic for the received plurality of sentences includes:

outputting one or more speech style characteristic candidates recommended based on the analysis result of the one or more sets of sentences; and selecting at least a part of the outputted one or more speech style characteristic candidates.

10. The method of claim 1, wherein an inspection result is generated by inspecting the synthetic speech for the plurality of sentences, and the method further includes changing the speech style characteristic applied to the synthetic speech based on the inspection result.

11. The method of claim 1, wherein an audio content including the synthetic speech is generated.

12. The method of claim 11, further comprising, in response to a request to download the generated audio content, receiving the generated audio content.

13. The method of claim 11, further comprising, in response to a request to stream the generated audio content, playing back the generated audio content in real time.

14. The method of claim 11, further comprising mixing the generated audio content with a video content.

15. The method of claim 1, further comprising outputting the received plurality of sentences, wherein the determining the speech style characteristic for the received plurality of sentences includes:

selecting a part of the outputted plurality of sentences;

outputting an interface for changing the speech style characteristic for the selected part of the outputted plurality of sentences; and changing a value indicative of the speech style characteristic for the part through the interface, and the part of the plurality of sentences and the changed value indicative of the speech style characteristic are inputted to the artificial neural network text-to-speech synthesis model and the synthetic speech is changed based on speech data outputted from the artificial neural network text-to-speech synthesis model.

16. The method of claim 1, further comprising:

receiving a speaker ID vector; and obtaining an embedding vector indicative of the speech style characteristic of a single role based on the speaker ID vector, wherein synthetic speech for the plurality of sentences is generated using the embedding vector.

17. The method of claim 1, wherein the change of the font style of text for the part of the set of sentences includes change of a font color for the part of the set of sentences.

18. The method of claim 1, further comprising:

receiving a change of width of the text for the part of the set of sentences being displayed, wherein a speed of the output synthetic speech for the part of the set of sentences is determined based on the changed width.

19. The method of claim 18 wherein the width of the text for the part of the set of sentences being displayed is increased; and the modified specific speech style characteristic includes a slower speed than the specific speech style characteristic.

20. A computer program stored on a non-transitory computer-readable recording medium for executing, on a computer, a method for processing synthetic speech for text through a user interface according to claim 1.

* * * * *